(12) United States Patent
Miyahara et al.

(10) Patent No.: US 8,336,415 B2
(45) Date of Patent: Dec. 25, 2012

(54) ROLLER SCREW

(75) Inventors: Soshi Miyahara, Tokyo (JP); Masahiko Yoshino, Tokyo (JP); Lina Teng, Tokyo (JP); Tsutomu Togashi, Tokyo (JP); Takashi Sakuyama, Tokyo (JP); Kentaro Nishimura, Tokyo (JP); Tetsuya Miura, Tokyo (JP); Akimasa Yoshida, Tokyo (JP); Yusuke Todoroki, Tokyo (JP)

(73) Assignee: THK Co., Ltd., Tokyo (JP)

( * ) Notice: Subject to any disclaimer, the term of this patent is extended or adjusted under 35 U.S.C. 154(b) by 172 days.

(21) Appl. No.: 12/740,924

(22) PCT Filed: Oct. 29, 2008

(86) PCT No.: PCT/JP2008/069633
§ 371 (c)(1),
(2), (4) Date: Jun. 16, 2010

(87) PCT Pub. No.: WO2009/057630
PCT Pub. Date: May 7, 2009

(65) Prior Publication Data
US 2010/0263467 A1 Oct. 21, 2010

(30) Foreign Application Priority Data

Nov. 2, 2007 (JP) ................. 2007-286791
Nov. 2, 2007 (JP) ................. 2007-286792

(51) Int. Cl.
*F16H 1/24* (2006.01)
*F16H 55/02* (2006.01)
*F16C 29/06* (2006.01)
(52) U.S. Cl. .............. 74/424.86; 74/424.87; 384/45
(58) Field of Classification Search ........... 74/424.82, 74/424.86, 424.87, 424.88, 424.91; 384/45, 384/50, 56, 565, 568
See application file for complete search history.

(56) References Cited

U.S. PATENT DOCUMENTS 3,055,230 A 9/1962 Strassberg
(Continued)

FOREIGN PATENT DOCUMENTS

JP 11-210858 A 8/1999
JP 2001-241527 A 9/2001
(Continued)

OTHER PUBLICATIONS

Notification of Transmittal of Translation of the International Preliminary Report on Patentability (Forms PCT/IB/373) of International Application No. PCT/JP2008/069633 mailed Jun. 1, 2010 with Forms PCT/IB/237.
International Search Report of PCT/JP2008/069633, mailing date of Feb. 10, 2009.

*Primary Examiner* — Justin Krause
(74) *Attorney, Agent, or Firm* — Westerman, Hattori, Daniels & Adrian, LLP

(57) ABSTRACT

Provided is a roller screw capable of preventing rollers moving from an unloaded return path to a loaded roller rolling path from coming into collision with a scooping portion. The roller screw has: a screw shaft 1 having a spiral roller rolling surface 1a formed on an outer peripheral surface thereof; a nut 2 having a loaded roller rolling surface 2a formed in an inner peripheral surface thereof; a circulation member 3 having an unloaded return path connecting one end of the loaded roller rolling surface 2a of the nut 2 to an opposite end thereof; and a plurality of rollers 4 arranged in a loaded roller rolling path 6 and the unloaded return path. In the circulation member 3, as a scooping portion that juts toward the screw shaft 1 and provided for scooping the rollers 4 moving in the loaded roller rolling path 6 up into the unloaded return path, a pair of diagonal corresponding parts 14 is provided which are in contact with diagonal parts 4e of a rectangular side surface of each roller 4 and a width between which is gradually narrower as they are deeper in the unloaded return path in such a manner that a cross section of the unloaded return path is closer to a rectangle.

10 Claims, 29 Drawing Sheets

U.S. PATENT DOCUMENTS

| | | | |
|---|---|---|---|
| 3,971,264 A * | 7/1976 | Detraz et al. | 74/424.87 |
| 2001/0017062 A1 | 8/2001 | Nishimura et al. | |
| 2002/0023513 A1* | 2/2002 | Sekiya et al. | 74/424.87 |
| 2002/0073794 A1* | 6/2002 | Ohkubo | 74/424.86 |
| 2004/0000208 A1* | 1/2004 | Michioka et al. | 74/424.86 |
| 2006/0013520 A1* | 1/2006 | Tamada et al. | 384/565 |
| 2007/0028712 A1* | 2/2007 | Teramachi et al. | 74/424.82 |
| 2008/0110285 A1* | 5/2008 | Pan et al. | 74/424.86 |

FOREIGN PATENT DOCUMENTS

| | | |
|---|---|---|
| JP | 2003-222221 A | 8/2003 |
| JP | 2006-118649 A | 5/2006 |
| JP | 2007-10060 A | 1/2007 |

* cited by examiner

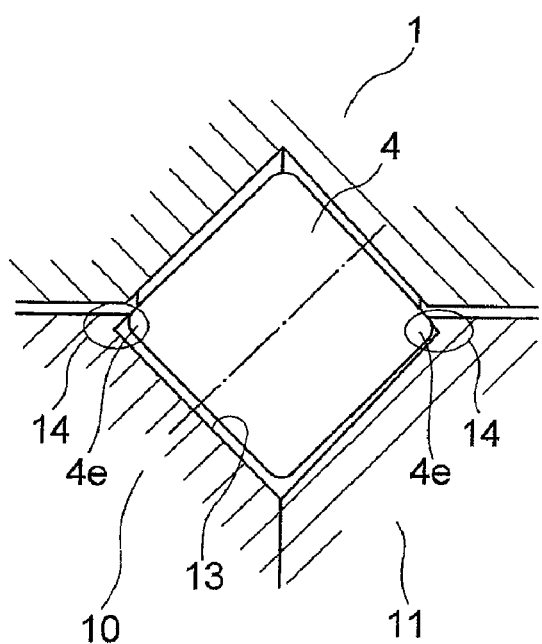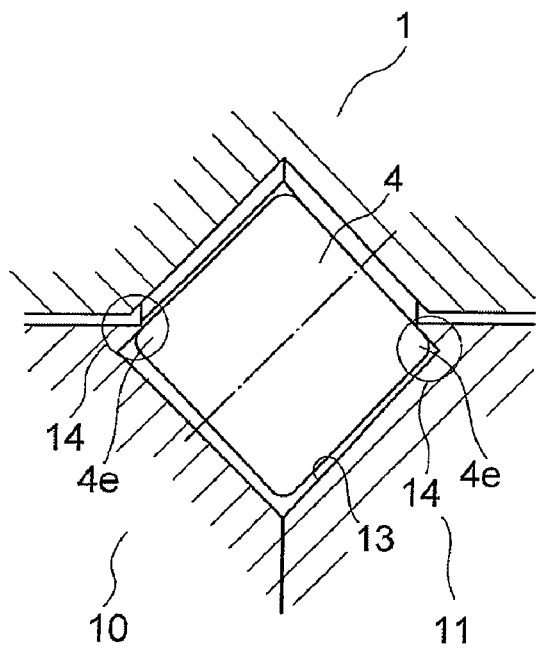
FIG. 13A — ROLLER START TO BE SCOOPED
FIG. 13B — ROLLER BEING SCOOPED FIG. 28A
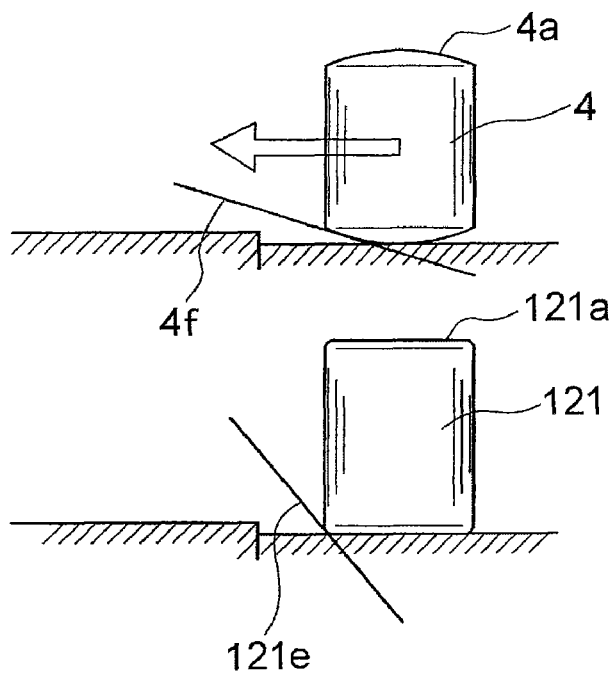
FIG. 28B
FIG. 29
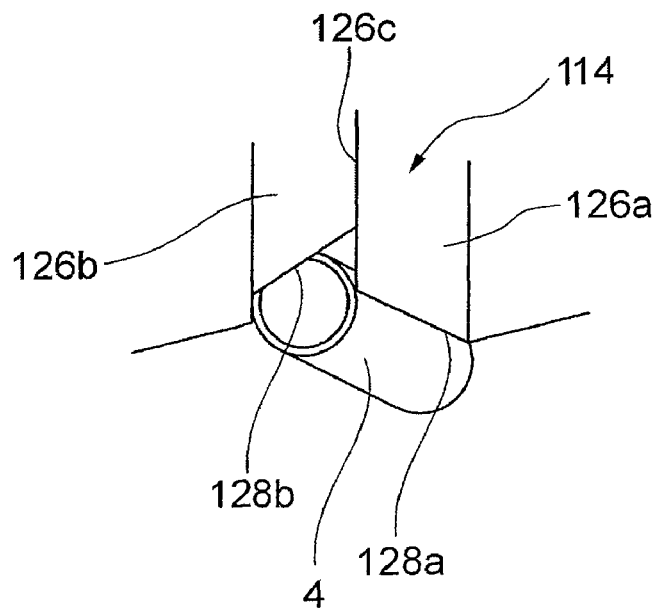

ROLLER SCREW

TECHNICAL FIELD

The present invention relates to a roller screw having rollers movably interposed between a screw shaft and a nut.

BACKGROUND ART

Recently, there has been developed a roller screw having rollers movably interposed between a screw shaft and a nut. As each roller is in line contact with a roller rolling surface, the roller screw has the advantage of larger load to bear as compared with a ball screw. However, although a ball can roll in every direction, the roller can move only in one direction and therefore, there is a problem that the roller is very difficult to circulate.

The roller screw has a circulation path having a spiral loaded roller rolling path between a spiral roller rolling surface formed on an outer peripheral surface of the screw shaft and a spiral loaded roller rolling surface formed on an inner peripheral surface of the nut and an unloaded return path connecting one end of the loaded roller rolling path to the other end. The unloaded return path is formed in a circulation member which is mounted on the nut. In the circulation member, a lip portion for scooping rollers moving on the roller rolling surface of the screw shaft is provided as a scooping portion for scooping the roller rolling on the spiral loaded roller rolling path. The lip portion juts from the nut toward the roller rolling surface of the screw shaft.

In the unloaded return path, clearance is provided around the rollers and the diameter of the unloaded return path is larger than the diameter of the loaded roller rolling path. In a conventional roller screw, in order to make up for a difference between diameters of the unloaded return path and the loaded roller rolling path, the inner wall surface of the lip portion of the circulation member is formed tapered with the width that gradually becomes narrower from the unloaded return path toward the loaded roller rolling path (see patent document 1). Then, the rollers moving in the unloaded return path are first aligned to be guided to the loaded roller rolling path.

As described above, the rollers moving in the spiral loaded roller rolling path are scooped by the scooping portion of the circulation member and guided into the unloaded return path. In the conventional roller screw, in order to smoothly scoop each roller moving on the loaded roller rolling path, the unloaded return path where the scooping portion is formed is arranged in the tangential direction of the loaded roller rolling path (see patent document 2). That is, it is arranged in the tangential direction of the circular loaded roller rolling path seen in the axial direction of the nut and in the lead angle direction of the loaded roller rolling path seen in the side surface direction of the nut.

[Patent document 1] Japanese Patent Application Laid-Open No. 2006-118649

[Patent document 2] Japanese Patent Application Laid-Open No. 11-210858

DISCLOSURE OF THE INVENTION

Problems to be Solved by the Invention

However, the rollers move from the loaded roller rolling path to the unloaded return path. If the rollers are scooped up by the lip portion with the narrowed entry, sometimes the rollers may fall to the roller rolling surface side of the screw shaft, come into collision with the edge of the lip portion and cannot be scooped up well. If the rollers come into collision with the edge of the lip portion, the edge of the lip portion may be broken or the rollers may be jammed.

In addition, as illustrated in FIG. 30, if the unloaded return path is arranged in the tangential direction of the loaded roller rolling path, a scooping portion 132 of the circulation member 131 cannot be close to the loaded roller rolling path 133. This is because, if it is arranged too closer, it is difficult to keep enough thickness to assure enough strength in order to prevent the scooping portion 132 from coming into contact with the screw shaft. Therefore, there is generated an unconstrained area from when the rollers 134 get out of the loaded roller rolling path 133 to when they are constrained by the scooping portion 132. In this unconstrained area, the rollers may be skewed, and as illustrated in FIG. 31, the end of the side surface of each of the rollers 134 in the axial direction may come into collision with the edge of the scooping portion 132. The roller 134 moving from the loaded roller rolling path to the unloaded return path comes into the scooping portion while it is pushed by the following roller 134. When the roller 134 is in collision with the edge of the scooping portion 132, the edge of the scooping portion 132 may be broken or the rollers 134 may be jammed.

Then, the present invention provides a roller screw capable of preventing rollers moving from an unloaded return path to a loaded roller rolling path from coming into collision with a scooping portion.

Further, the present invention has another object to provide a roller screw capable of preventing skewing of rollers moving from the unloaded return path to the loaded roller rolling path and enabling smooth movement of the rollers.

Means for Solving the Problems

The present invention will be explained below.

In order to solve the above-mentioned problems, a first embodiment of the invention includes a roller screw comprising a screw shaft having a spiral roller rolling surface formed on an outer peripheral surface of the screw shaft; a nut having a loaded roller rolling surface formed in an inner peripheral surface of the nut, facing the roller rolling surface of the screw shaft; a circulation member provided on the nut and having an unloaded return path connecting one end of the loaded roller rolling surface of the nut to an opposite end thereof; a plurality of rollers arranged in a loaded roller rolling path between the roller rolling surface of the screw shaft and the loaded roller rolling surface of the nut and in the unloaded return path of the circulation member; and a scooping portion, provided in the circulation member, for scooping the rollers moving in the loaded roller rolling path up into the unloaded return path, the scooping portion having a pair of diagonal corresponding parts that are in contact with diagonal parts of a rectangular side surface of each of the rollers, a width between the diagonal corresponding parts becoming gradually narrower as the diagonal corresponding parts are deeper in the unloaded return path in such a manner that a cross section of the unloaded return path is closer to a rectangle, and the rollers that move from the loaded roller rolling path to the unloaded return path being scooped up into the unloaded return path while the diagonal parts of each of the rollers are held by the diagonal corresponding parts.

A second embodiment includes a roller screw comprising a screw shaft having a spiral roller rolling surface formed on an outer peripheral surface of the screw shaft; a nut having a loaded roller rolling surface formed in an inner peripheral surface of the nut, facing the roller rolling surface of the screw shaft; a circulation member provided on the nut and having an unloaded return path connecting one end of the loaded roller rolling surface of the nut to an opposite end thereof; a plurality of rollers arranged in a loaded roller rolling path between the roller rolling surface of the screw shaft and the loaded roller rolling surface of the nut and in the unloaded return path of the circulation member; and a scooping portion, provided in the circulation member, for scooping the rollers moving in the loaded roller rolling path up into the unloaded return path, the scooping portion having a pair of diagonal corresponding parts which jut toward the screw shaft from an edge of a continuous path of V shaped cross section connected to the loaded roller rolling surface of the nut and which correspond to diagonal parts of a rectangular side surface of each of the rollers, and a width between the diagonal corresponding parts becoming gradually narrower as the diagonal corresponding parts are deeper in the unloaded return path in such a manner that a cross section of the unloaded return path formed by the diagonal corresponding parts and the continuous path is gradually closer to a rectangle in accordance with a deepness of the unloaded return path.

A third embodiment is characterized in that in the roller screw described in the first or second embodiments, the roller screw further comprises a plurality of retainers, each provided between adjacent ones of the rollers, for preventing the adjacent rollers from coming into contact with each other, between the diagonal corresponding parts, a lip portion is provided for scooping the retainers out of a circulation raceway into the unloaded return path, and the lip portion has inner wall surfaces that are away from a raceway of the rollers scooped by the diagonal corresponding parts.

A fourth embodiment is characterized in that in the roller screw described in the third embodiment, the inner wall surfaces of the lip portion has a cross section orthogonal to the unloaded return path, which cross section is V shaped in such a manner that an apex angle α formed by connecting the inner wall surfaces of the diagonal corresponding parts and an apex on a diagonal line connecting diagonal parts, out of contact with the diagonal corresponding parts, of each of the rollers scooped by the diagonal corresponding parts is less than 90 degrees.

A fifth embodiment is characterized in that in the roller screw described in the third or fourth embodiments, the inner wall surfaces of the lip portion are formed to be tapered in such a manner that a cross sectional area of the unloaded return path becomes gradually larger from a side of the unloaded return path toward the loaded roller rolling path.

A sixth embodiment includes a roller screw comprising a screw shaft having a spiral roller rolling surface formed on an outer peripheral surface of the screw shaft; a nut having a loaded roller rolling surface formed in an inner peripheral surface of the nut, facing the roller rolling surface of the screw shaft; a circulation member provided on the nut and having an unloaded return path connecting one end of the loaded roller rolling surface of the nut to an opposite end thereof; a plurality of rollers arranged in a loaded roller rolling path between the roller rolling surface of the screw shaft and the loaded roller rolling surface of the nut and in the unloaded return path of the circulation member; and a scooping path provided in the unloaded return path and having a scooping portion for scooping the rollers moving in the loaded roller rolling path up into the unloaded return path, a moving direction in the scooping path of each of the rollers moving from the loaded roller rolling path to the unloaded return path being outside of a tangential direction of the loaded roller rolling path when seen in an axial direction of the nut.

A seventh embodiment includes a roller screw comprising a screw shaft having a spiral roller rolling surface formed on an outer peripheral surface of the screw shaft; a nut having a loaded roller rolling surface formed in an inner peripheral surface of the nut, facing the roller rolling surface of the screw shaft; a circulation member provided on the nut and having an unloaded return path connecting one end of the loaded roller rolling surface of the nut to an opposite end thereof; a plurality of rollers arranged in a loaded roller rolling path between the roller rolling surface of the screw shaft and the loaded roller rolling surface of the nut and in the unloaded return path of the circulation member; and a scooping path provided in the unloaded return path circulation member and having a scooping portion for scooping the rollers moving in the loaded roller rolling path up into the unloaded return path, a center line of the scooping path being outside of a tangential direction of the loaded roller rolling path when seen in an axial direction of the nut.

An eighth embodiment is characterized in that in the roller screw described in the sixth or seventh embodiments, the unloaded return path of the circulation member has a straight path that extends in parallel with an axis line of the nut and direction change paths that are provided at respective ends of the straight path and each have the scooping path, and when seen in the axial direction of the nut, a center line of the scooping path in each of the direction change path is placed outside of a tangential direction of a center line of the loaded roller rolling path and the direction change path is curved at a midpoint toward the straight path so as to connect the scooping path to the straight path.

A ninth embodiment is a roller screw comprising a screw shaft having a spiral roller rolling surface formed on an outer peripheral surface of the screw shaft; a nut having a loaded roller rolling surface formed in an inner peripheral surface of the nut, facing the roller rolling surface of the screw shaft; a circulation member provided on the nut and having an unloaded return path connecting one end of the loaded roller rolling surface of the nut to an opposite end thereof; a plurality of rollers arranged in a loaded roller rolling path between the roller rolling surface of the screw shaft and the loaded roller rolling surface of the nut and in the unloaded return path of the circulation member; and a scooping portion, provided in the circulation member, for scooping the rollers moving in the loaded roller rolling path up into the unloaded return path, and the scooping portion covering each of the rollers when a center of the roller is positioned at a boundary between the loaded roller rolling path and the unloaded return path.

A tenth embodiment is characterized in that in the roller screw described in the ninth embodiment, the unloaded return path has a scooping path where the scooping portion is formed, and a moving direction in the scooping path of each of the rollers moving from the loaded roller rolling path to the unloaded return path is outside of a tangential direction of the loaded roller rolling path when seen in an axial direction of the nut.

An eleventh embodiment is characterized in that in the roller screw described in the sixth, seventh, or eighth embodiments, each of the rollers has a spherical end surface.

A twelth embodiment is characterized in that in the roller screw described in the sixth, seventh, or ninth embodiments, the rollers are parallel-arranged with axis lines of adjacent ones of the rollers kept approximately in parallel with each other, the scooping portion having a mountain-shaped lip portion that juts toward the screw shaft and has a first wall part corresponding to an end surface of each of the rollers and a second wall part corresponding to a side surface of the roller, and an edge of the second wall part is closer to the loaded roller rolling path than an edge of the first wall part so that the rollers moving from the loaded roller rolling path to the unloaded return path are constrained by the second wall part before the rollers are constrained by the first wall part.

Effects of the Invention

According to the first embodiment, for example, it is possible to scoop each roller by the diagonal corresponding parts of the scooping portion holding diagonal parts of the roller. As no lip portion needs to be provided at the scooping portion, there is no fear of breakage of the lip portion.

According to the second embodiment, for example, it is possible to scoop each roller by the diagonal corresponding parts of the scooping portion holding diagonal parts of the roller. As no lip portion needs to be provided at the scooping portion, there is no fear of breakage of the lip portion.

According to the third embodiment, for example, it is possible to scoop up a retainer that is out of a circulation raceway by the retainer-scooping lip portion. As this lip portion is provided away from the raceway of the rollers and is out of contact with the rollers, the lip portion can be prevented from being broken by contact with the rollers.

According to the fourth embodiment, for example, it is possible to keep the inner wall surface of the lip portion away from the rollers.

According to the fifth embodiment, for example, it is possible to keep the screw-shaft side edge of the lip portion out of the rollers. Besides, it is possible to guide the retainer scooped by the retainer scooping lip portion into the unloaded return path smoothly.

According to the sixth embodiment, for example, as the moving direction of the rollers in the scooping path is placed outside the tangential direction of the loaded roller rolling path, it is possible to make the edge of the scooping portion close to the loaded roller rolling path while keeping enough thickness of the scooping portion. As the area to constrain the rollers by the scooping portion is longer and the area not to constrain the rollers is shorter, it is possible to prevent skewing of the rollers.

According to the seventh embodiment, for example, as the moving direction of the rollers in the scooping path is placed outside the tangential direction of the loaded roller rolling path, it is possible to make the edge of the scooping portion close to the loaded roller rolling path while keeping enough thickness of the scooping portion. As the area to constrain the rollers by the scooping portion is longer and the area not to constrain the rollers is shorter, it is possible to prevent skewing of the rollers.

According to the eighth embodiment, for example, it is possible to connect the scooping path directed outside of the tangential direction with the straight path.

According to the ninth embodiment, for example, the end part of each roller in the moving direction comes into the scooping portion of the circulation member before the roller gets out of the loaded roller rolling path completely. Therefore, it is possible to eliminate the area not to constrain the roller.

According to the tenth embodiment, for example, as the moving direction of each roller in the unloaded return path is placed outside of the tangential direction of the loaded roller rolling path, it is possible to make the edge of the scooping portion close to the loaded roller rolling path while keeping enough thickness of the scooping portion.

According to the eleventh embodiment, for example, it is possible to prevent the end surface of each roller from being caught in the edge of the scooping portion when the roller enters the scooping portion of the circulation member. It is also possible to prevent the end surface of the roller being caught in an elevation change even when the roller passes through the elevation change between the components.

According to the twelfth embodiment, for example, as the side surface of each roller is first constrained by the lip portion, the end surface of the roller abuts against the edge of the lip portion and the lip portion can be prevented from being damaged.

BRIEF DESCRIPTION OF THE DRAWINGS

FIGS. 13A and 13B are cross sectional views each illustrating scooping of a roller by a pair of diagonal corresponding parts (FIG. 13A illustrating the roller that is started to be scooped and FIG. 13B illustrating the roller that is being scooped).

FIGS. 28A and 28B are schematic views illustrating rollers moving on an elevation change (FIG. 28A illustrating a roller having spherical end surfaces and FIG. 28B illustrating a roller having R-shaped end surfaces).

FIG. 29 is a perspective view illustrating another example of the lip portion.

REFERENCE NUMERALS

1 . . . screw shaft, 1a . . . roller rolling surface, 2 . . . nut, 2a . . . loaded roller rolling surface, 3 . . . circulation member, 4 . . . roller, 4a . . . end surface, 4e . . . diagonal part, 5 . . . retainer, 6 . . . loaded roller rolling path, 6a . . . tangential direction of loaded roller rolling path, 7 . . . direction change path, 12 . . . direction change path component, 13 . . . continuous path, 14 . . . diagonal corresponding part, 15 . . . lip portion, 15b . . . inner wall surface, 32 . . . diagonal line, 33 . . . apex, α . . . apex angle, 107 . . . direction change path, 107a . . . center line of direction change path, 107b . . . scooping path, 110 . . . R piece, 111 . . . end piece, 112 . . . direction change path component, 114 . . . lip portion (scooping portion), 114a . . . edge

MODE FOR CARRYING OUT THE INVENTION

Figure 1:
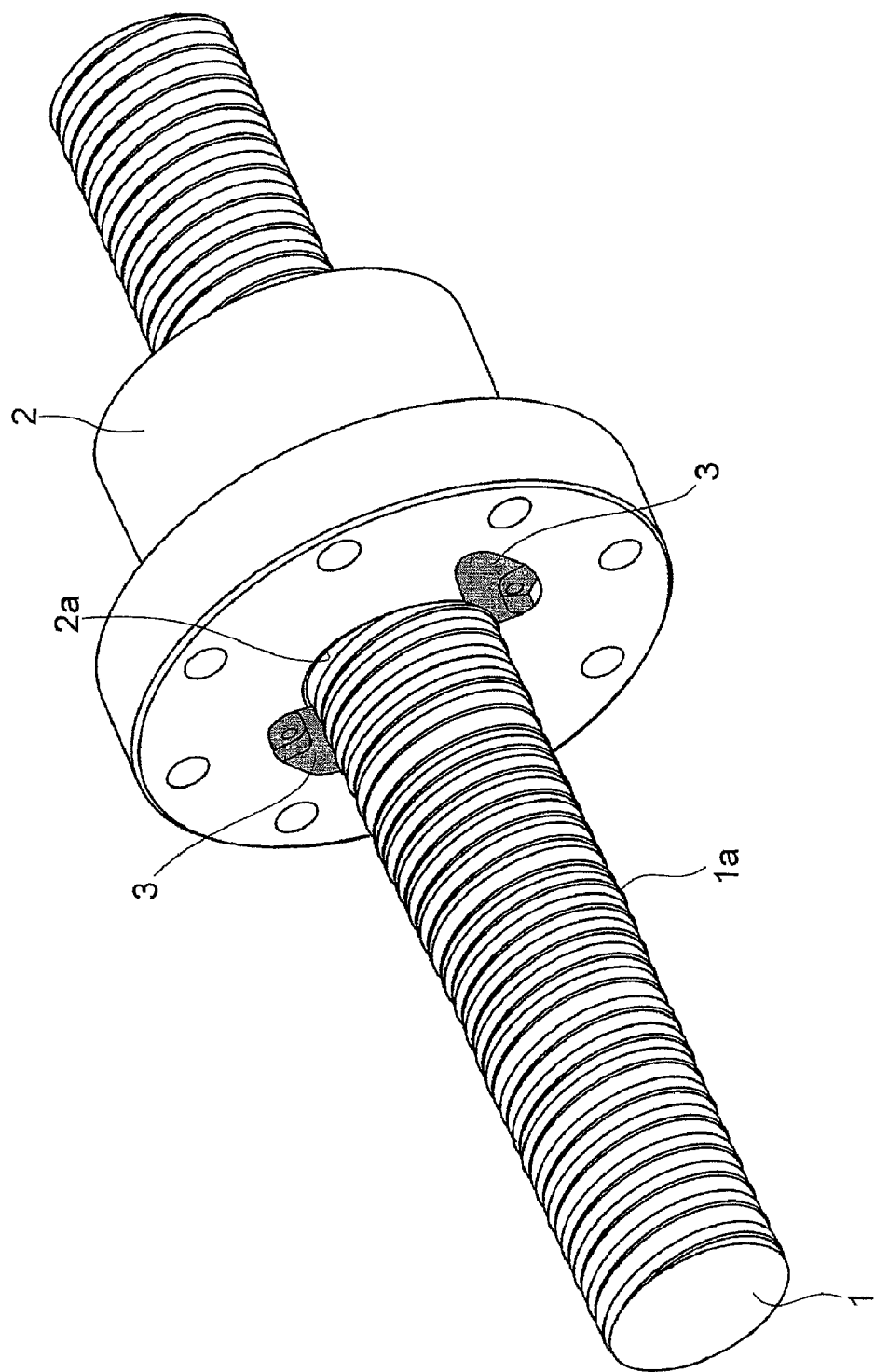
FIG. 1 is a perspective view of a roller screw according to an exemplary embodiment of the present invention.
Figure 2:
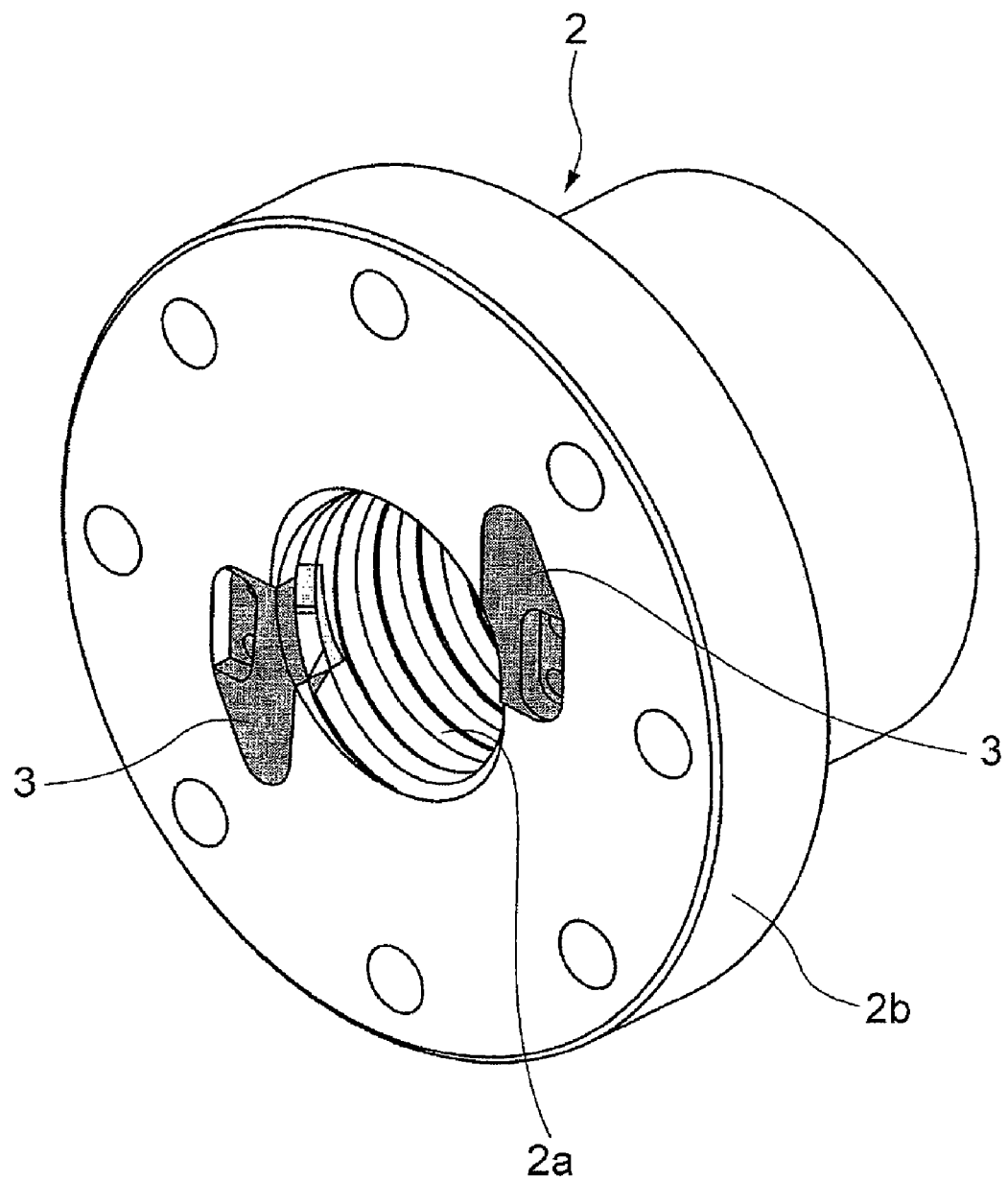
FIG. 2 is a perspective view of a nut of the above-mentioned roller screw.

FIGS. 1 and 2 are perspective views of a roller screw according to an exemplary embodiment of the present invention. FIG. 1 illustrates a perspective view of the roller screw (including a partial cross-sectional view).

The roller screw has a screw shaft 1 with a spiral roller rolling surface 1a formed on an outer peripheral surface of the screw shaft and a nut 2 with a spiral loaded roller rolling surface 2a formed on an inner peripheral surface of the nut opposing the roller rolling surface 1a.

The screw shaft 1 is a steel bar made of carbon steel, chrome steel or stainless steel having the spiral roller rolling surface 1a formed on the outer peripheral surface with a predetermined lead by cutting and grinding or rolling. The loaded roller rolling surface 2a has a V-shaped cross section and its open angle is about 90 degrees. In this embodiment, two roller rolling surfaces 1a are formed on the outer peripheral surface of the screw shaft 1. Then, a plurality of rollers is arranged in parallel with each other in each of the two roller rolling surfaces 1a. The axial lines of the rollers arranged in parallel in the two roller rolling surfaces 1a are opposite to each other. This is to bear loads in the opposite two directions along the axis of the screw shaft. In order to circulate the rollers moving in the two roller rolling surfaces 1a, two circulation members 3 are provided. Needless to say, the number of threads of the roller screw may be determined appropriately, such as one, two or three, depending on the use purpose of the roller screw.

FIG. 2 is a perspective view of the nut 2. The nut 2 is a cylinder made of carbon steel, chrome steel or stainless steel having the spiral loaded roller rolling surface 2a formed on the inner peripheral surface with a predetermined lead by cutting and grinding or rolling. The loaded roller rolling surface 2a has a V-shaped cross section and its open angle is about 90 degrees. At the end of the outer periphery of the nut 2 in the axial direction, a flange 2b is formed for mounting the nut 2 on another device.

Figure 3:
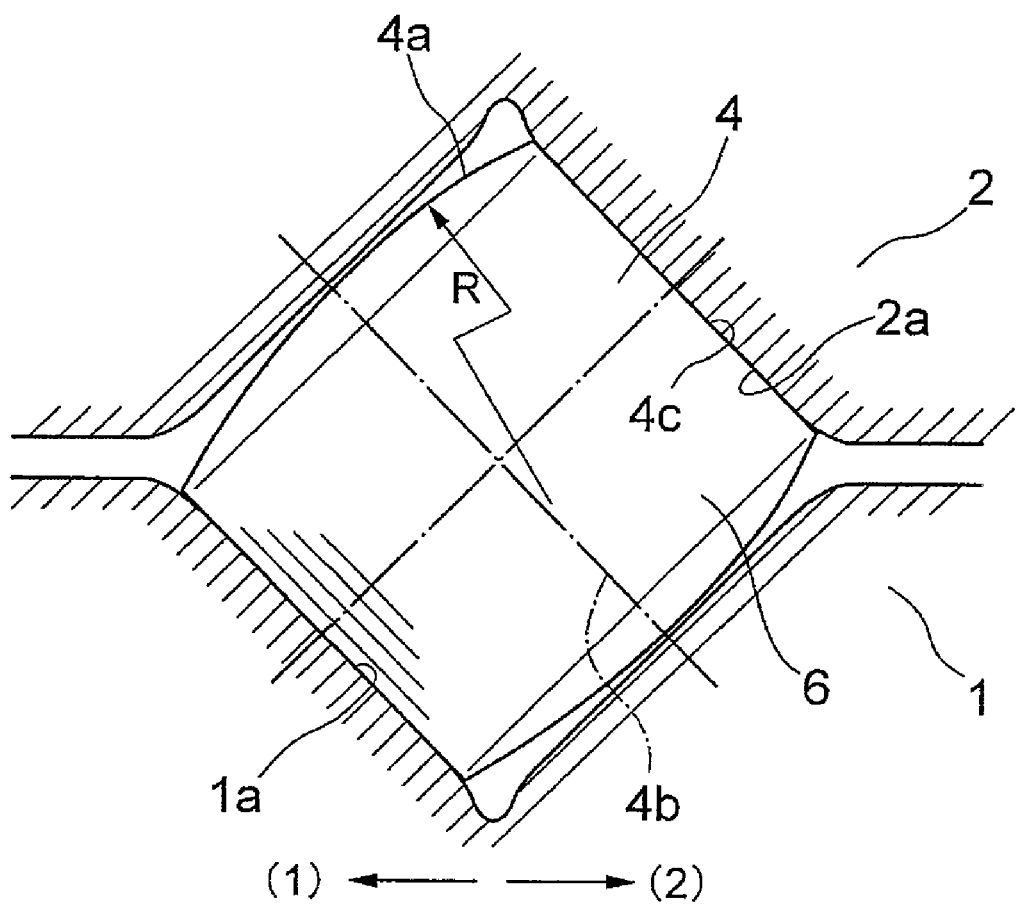
FIG. 3 is a side view illustrating a roller sandwiched between a screw shaft and the nut.

FIG. 3 illustrates a roller 4 interposed between the roller rolling surface 1a of the screw shaft 1 and the loaded roller rolling surface 2a of the nut 2. The roller 4 is of a cylindrical shape and its diameter is almost the same as the length. The shape of the roller 4 seen from the side surface is close to a square. The roller 4 has end surfaces 4a which are chamfered to be spherical with a predetermined curvature radius R. As each of the end surfaces 4a is spherical, the end surface 4a of the roller 4 is in contact with the roller rolling surface 1a at one point. In each of the two loaded roller rolling paths 6 between the loaded roller rolling surfaces 2a of the nut 2 and the roller rolling surfaces 1a of the screw shaft 1, the rollers 4 are parallel-arranged with the axis lines of adjacent rollers in parallel with each other. Between the adjacent rollers 4, a retainer 5 is interposed (see FIG. 12). The retainer 5 holds the attitude of each roller 4 in such a manner that the axis line of the roller 4 passes through the center line of the screw shaft 1.

The roller 4 bears a load at its side surface 4a that is in contact with the loaded roller rolling surface 2a of the nut 2 and the roller rolling surface 1a of the screw shaft 1, but it does not bear a load at the end surface 4a. Therefore, each roller bears the load only in one axial direction of the screw shaft 1. The rollers 4 can bear loads in opposing two directions ((1) and (2)) by differentiating the directions of the axis lines 4b of the parallel-arranged rollers 4 in the adjacent two loaded roller rolling paths 6.

Figure 4:
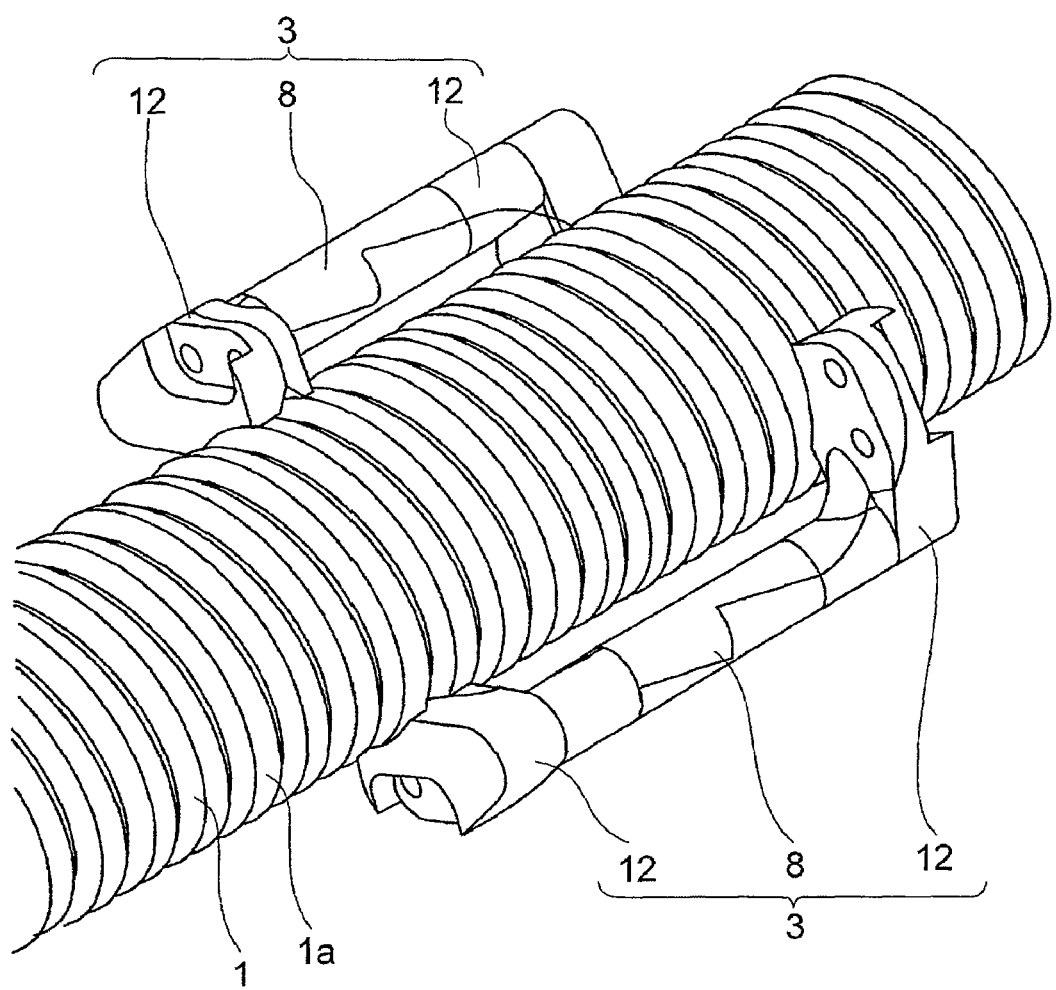
FIG. 4 is a perspective view of the screw shaft and a circulation member.

FIG. 4 illustrates a positional relation between the screw shaft 1 and the circulation member 3 mounted on the nut 2. The circulation member 3 has a circulation pipe 8 inserted into a through hole extending in the axial direction of the nut 2 and a pair of direction change path components 12 mounted at the respective ends of the circulation pipe 8 in the axial direction. In the circulation member 3, the unloaded return path is formed connecting one end of the loaded roller rolling path 6 to the other. The unloaded return path has a straight path formed in the circulation pipe 8 and extending straight in parallel with the center line of the nut 2 (see FIG. 5) and a pair of direction change paths 7 connected to both ends of the straight path 9 and formed in the pair of direction change path components 12 (see FIG. 6). Once each roller 4 rolls up to an end of the loaded roller rolling path 6, the roller 4 is guided into the direction change path 7 of the circulation member 3. After passing through the straight path 9, the roller 4 is returned from the other direction change path 7 back to the other end of the loaded roller rolling path 6.

Figure 5:
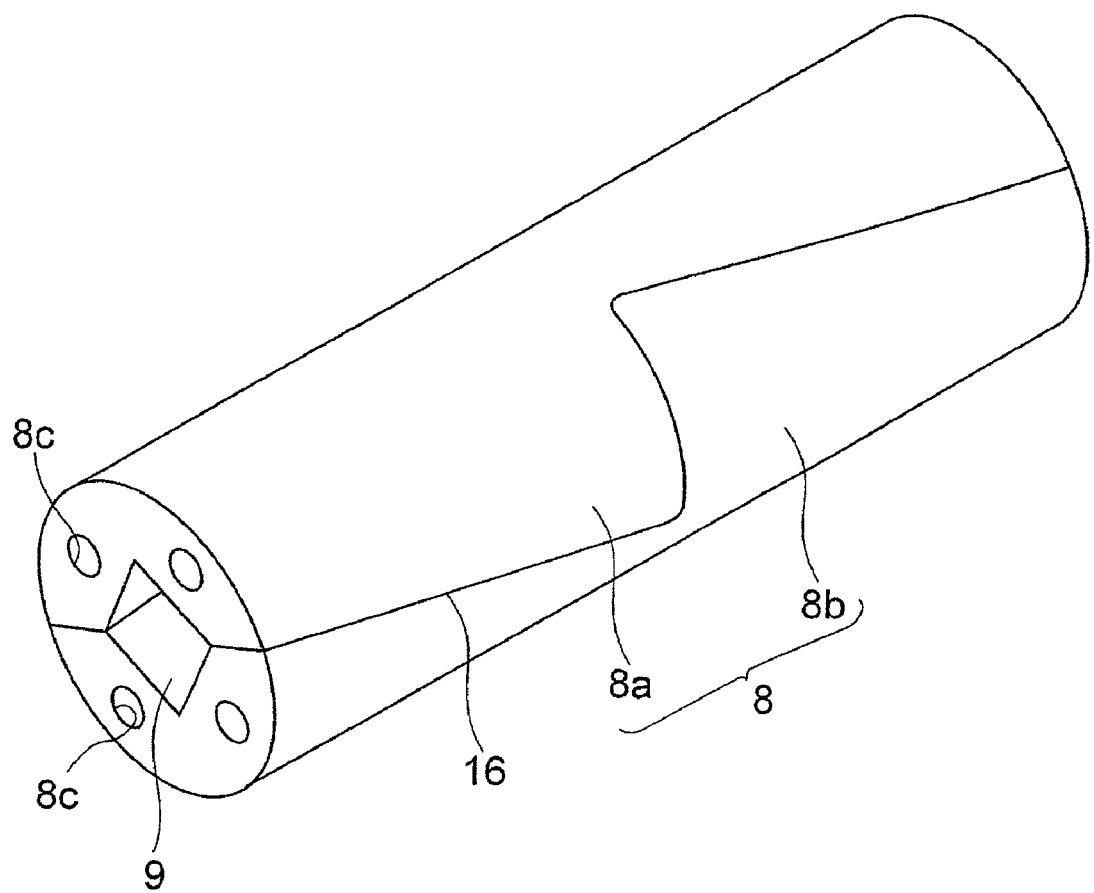
FIG. 5 is a perspective view of a circulation pipe.

FIG. 5 illustrates the circulation pipe 8. The circulation pipe 8 is formed by combining two split pieces 8a and 8b. Inside the circulation pipe 8, the straight path 9 is formed extending straight in parallel with the axial direction of the nut 2. This straight path 9 is twisted in such a manner that the attitude of each roller 4 moving in the straight path 9 is rotated. As the attitude of the roller is rotated in the straight path 9, the roller 4 scooped up from an end of the loaded roller rolling path 6 can be returned to the other end of the loaded roller rolling path 6 with the attitudes of the roller 4 at the respective ends of the loaded roller rolling path 6 match each other.

The mating surfaces of the split pieces 8a and 8b are placed on the diagonal line of the straight path 9 of rectangular cross section. As the straight path 9 is twisted, the mating surfaces 16 of the split pieces 8a and 8b are also twisted. At a midpoint of the circulation pipe 8 in the axial direction, the apexes of the rectangle of the mating surfaces 16 are changed. This is to prevent undercut from occurring when the twisted straight path 9 is formed in the split pieces 8a and 8b. At each of the both end surfaces of the circulation pipe 8 in the axial direction, a positioning bore 8c is formed for positioning the circulation pipe 8.

Figure 6:
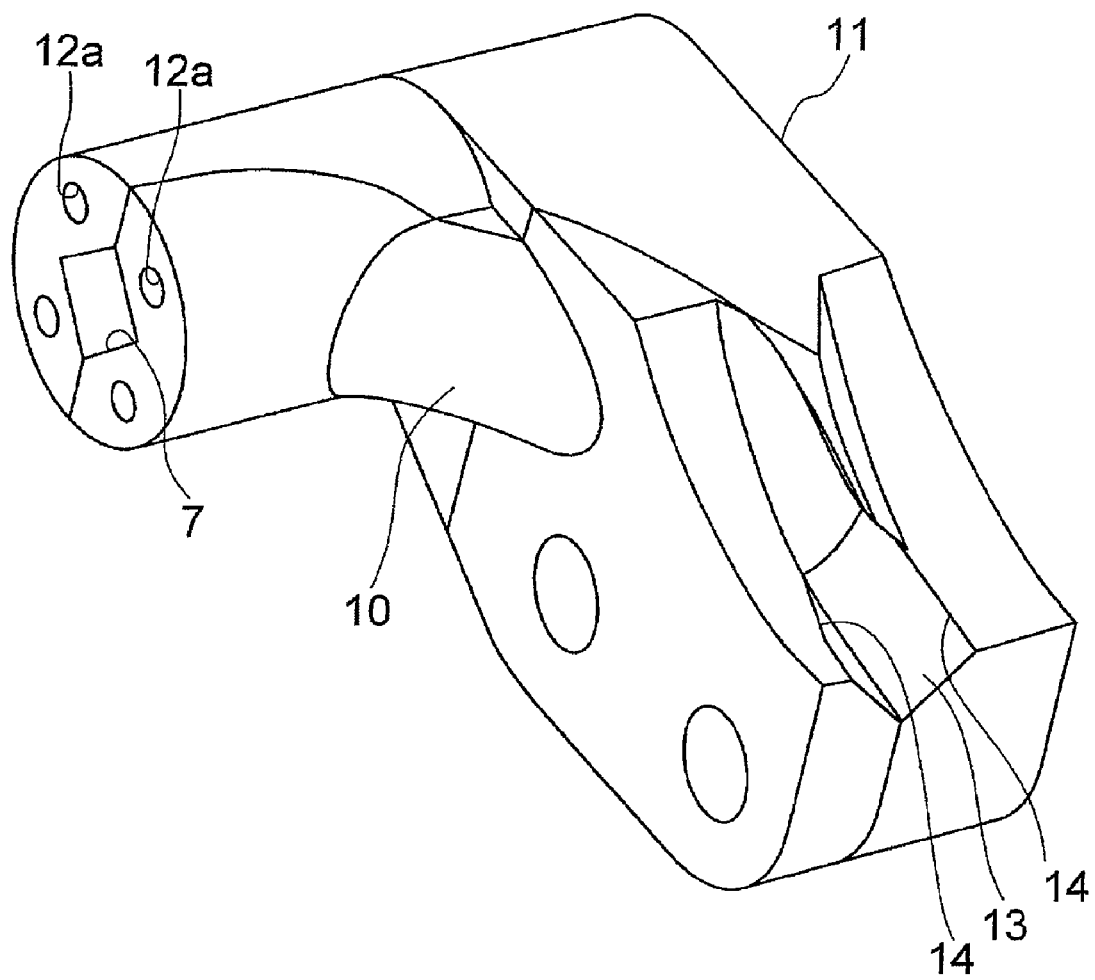
FIG. 6 is a perspective view of a direction change path component.

FIG. 6 is a perspective view of the direction change path component 12. The direction change path component 12 is mounted on an end surface of the nut 2. The direction change path component 12 is combination of an R piece 10 that forms the inner peripheral side of the direction change path 7 and an end piece 11 that forms the outer peripheral side of the direction change path 7.

In the direction change path component 12, a continuous path 13 having a V-shaped cross section is formed continuous to the loaded roller rolling surface 2a of the nut 2. The continuous path 13 extends straight in the tangential direction of the spiral loaded roller rolling surface 2a. The direction change path 7 extends straight in the continuous path 13 and is curved into an arc. In the direction change path 7, clearance is provided around the rollers 4. The depth of the continuous path 13 is greater than that of the loaded roller rolling surface 2a of the nut 2. In order to prevent an elevation change from occurring at a connecting portion between the loaded roller rolling surface 2a and the continuous path 13, the loaded roller rolling surface 2a is chamfered.

At an edge of the continuous path 13, a pair of diagonal corresponding parts 14 is formed corresponding to diagonal parts of a rectangular side surface of the roller and jutting toward the screw shaft 1. This paired diagonal corresponding parts 14 function as a scooping portion for scooping the rollers 4 moving in the loaded roller rolling path 6 up into the direction change path 7. Between the paired diagonal corresponding parts 14, a V-shaped mountain-shaped lip portion 15 is formed (see FIG. 7) for scooping the retainer 5 out of the circulation raceway up into the unloaded return path. When the direction change path component 12 is mounted on the nut 2, the structures of these paired diagonal corresponding parts 14 and lip portion 15 will be described later.

At a joint surface of the direction change path component 12 with the circulation pipe 8, a positioning bore 12a is formed. The circulation pipe 8 and the direction change path component 12 can be positioned by inserting positioning pins into the positioning bores 8c and 12a of the circulation pipe 8 and the direction change path component 12, respectively.

Figure 7:
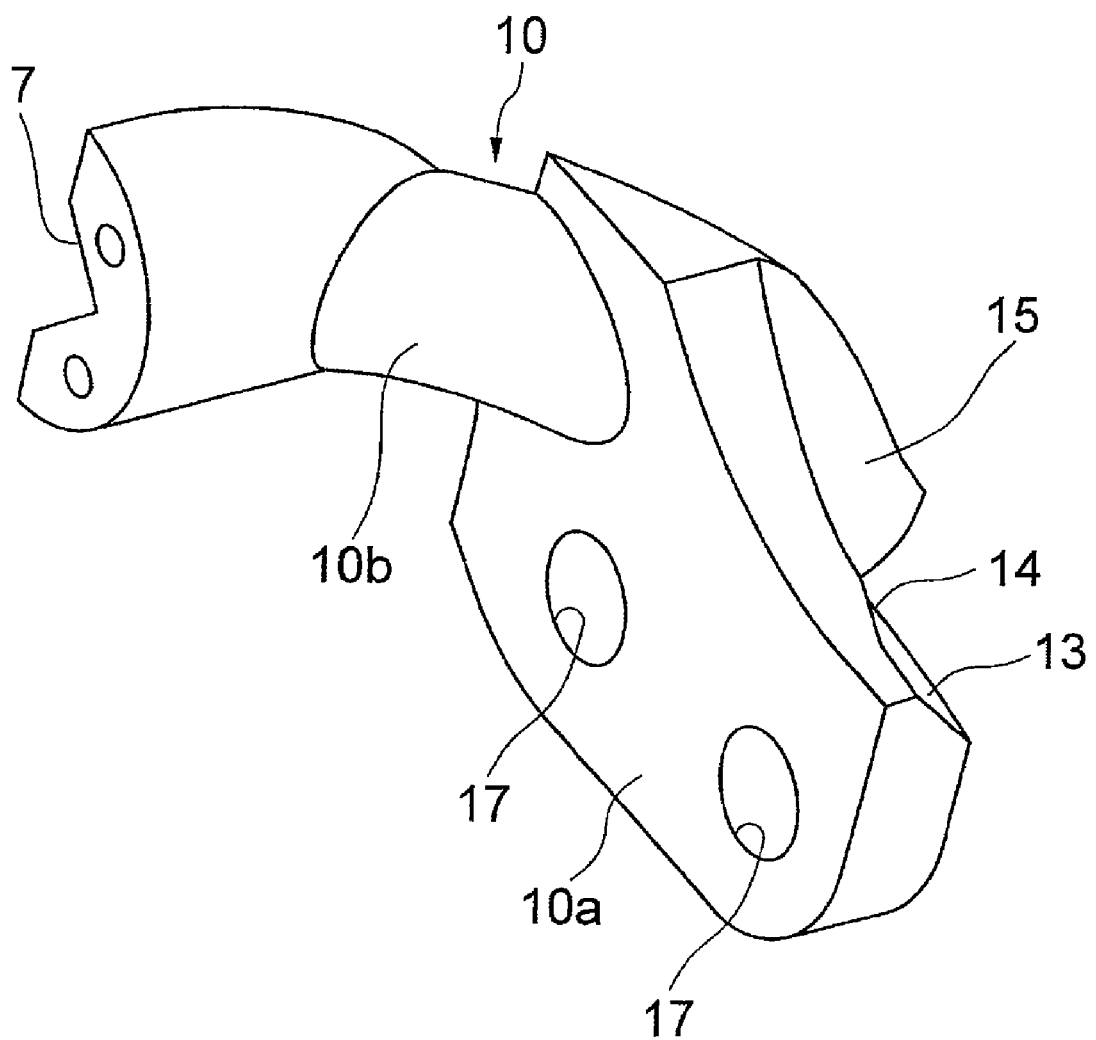
FIG. 7 is a perspective view of an R piece.
Figure 8:
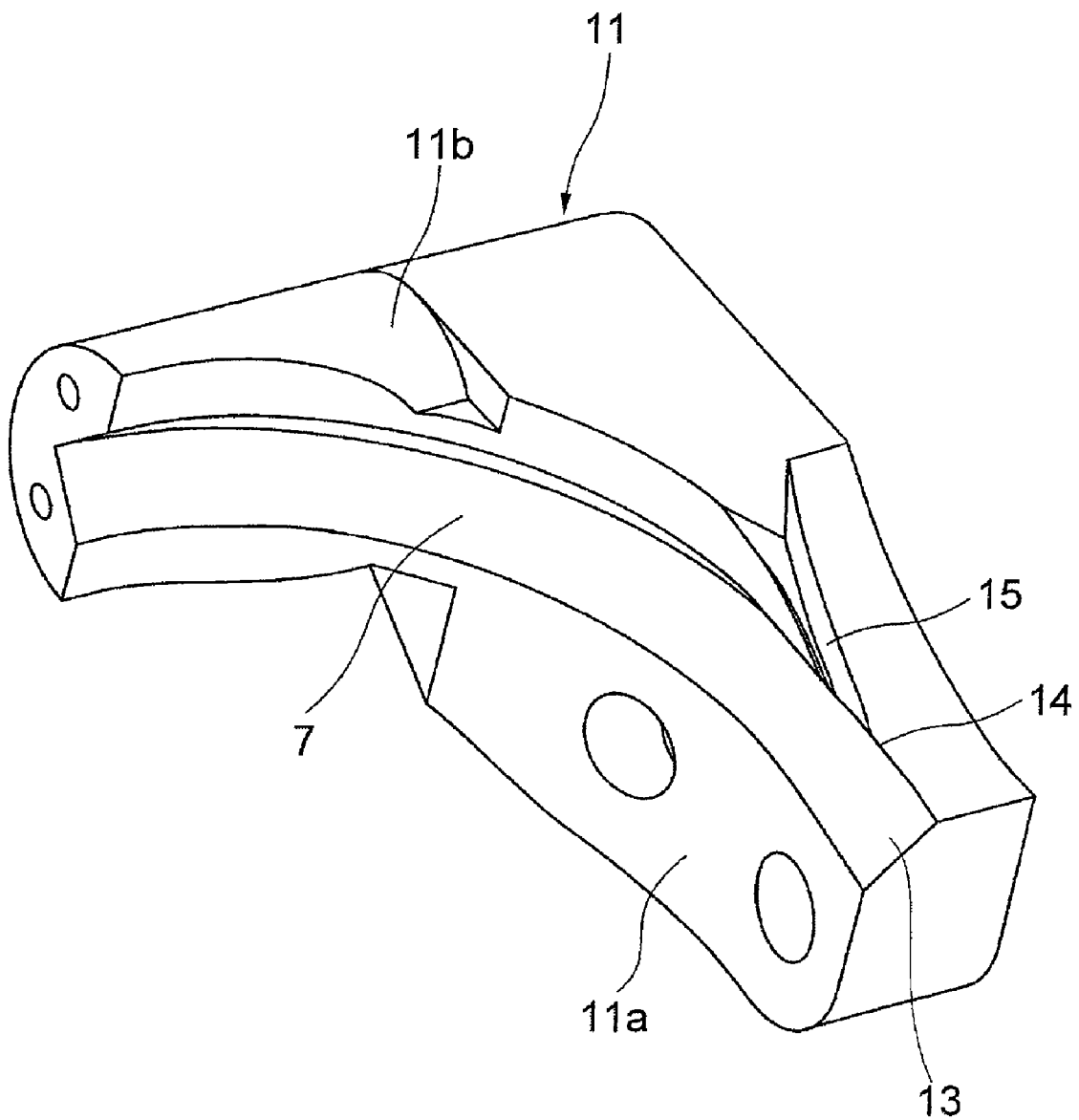
FIG. 8 is a perspective view of an end piece.

FIG. 7 is a perspective view of the R piece 10 and FIG. 8 is a perspective view of the end piece 11. As described above, the direction change path 7 extends straight in the continuous path 13 and then, is curved into an arc. The direction change path component 12 is split into the inner peripheral side R piece 10 and the outer peripheral side end piece 11 along the diagonal line of rectangular cross section of the direction change path 7. As illustrated in FIG. 7, the R piece 10 has a flange portion 10a mounted on the end surface of the nut 2 and a main body portion 10b in which the direction change path is formed. In the flange portion 10a, a mounting hole 17 is formed for mounting the R piece 10 on the nut 2. At a part of the flange portion 10 where the continuous path 13 is formed, one of the paired diagonal corresponding parts 14 for scooping up the rollers 4 moving in the loaded roller rolling path 6 is formed. Besides, in the diagonal corresponding part 14, a half of the lip portion 15 is formed for scooping up the retainer 5 out of the circulation raceway. The R piece 10 may be manufactured by metal cutting, metal injection molding or resin molding.

As illustrated in FIG. 8, the end piece 11 has a flange portion 11a to be mounted at an end surface of the nut 2 and a main body portion 11b where the direction change path 7 is formed. In apart of the flange portion 11a where the continuous path 13 is formed, one of the paired diagonal corresponding parts 14 for scooping the rollers 4 moving in the loaded roller rolling path 6 is formed. Besides, in the diagonal corresponding part 14, a half of the lip portion for scooping up the retainer 5 out of the circulation raceway is formed. The end piece 11 may be manufactured by metal cutting, metal injection molding or resin molding.

Figure 9:
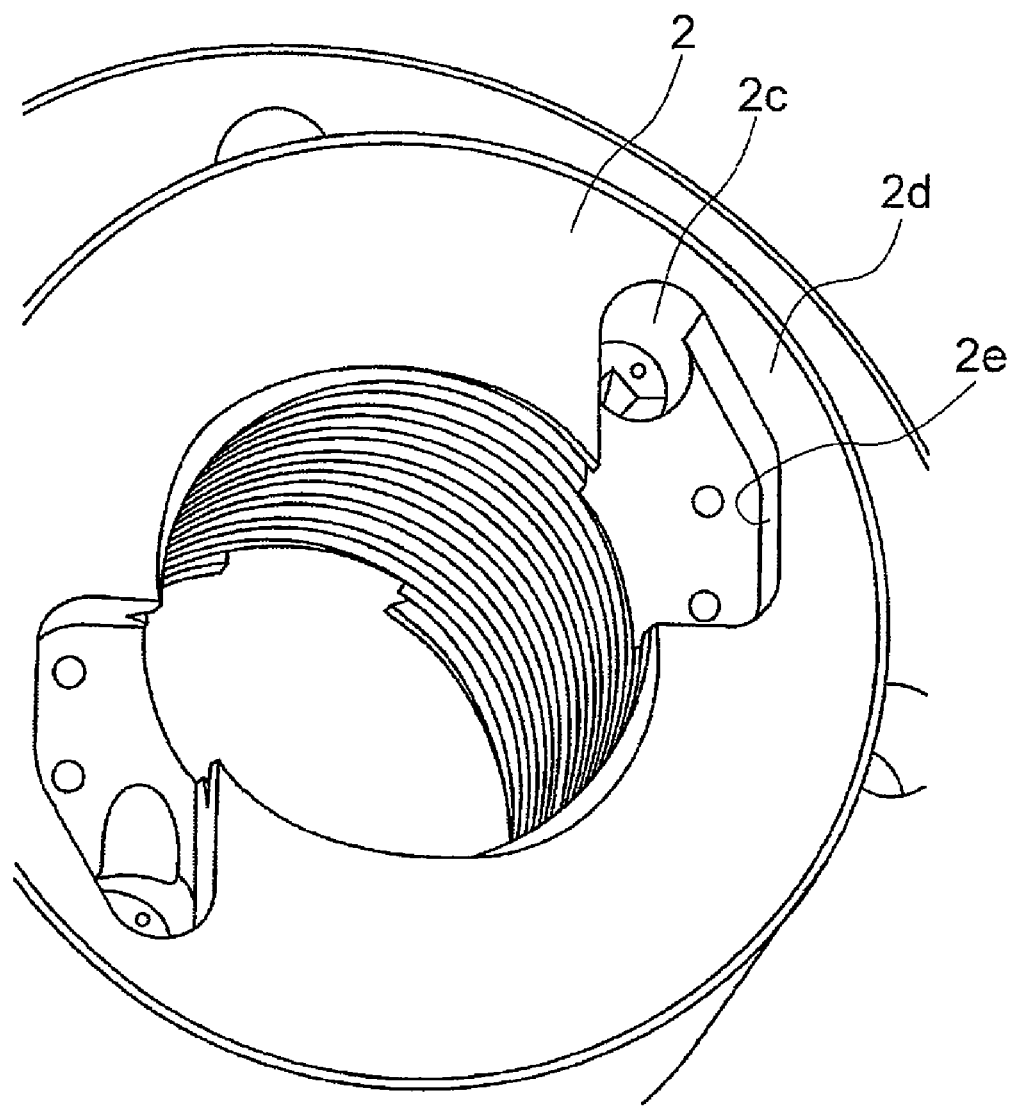
FIG. 9 is a perspective view of the nut into which the circulation pipe is inserted.

FIG. 9 is a perspective view of the nut 2. In the nut 2, a through hole 2c is formed extending straight in parallel with the axis line of the nut 2. The circulation pipe 8 is inserted into the through hole 2c. Besides, in an end surface 2d of the nut 2 in the axial direction, a recess 2e is formed which shape matches the flange portions 10a and 11a of the direction change path component 12. The R piece 10 and the end piece 11 are put together, their flange portions 10a and 11a are fit in the recess 2e, and a bolt (not shown) is fit in the nut so that the direction change path component 12 can be mounted on the nut 2.

Figure 10:
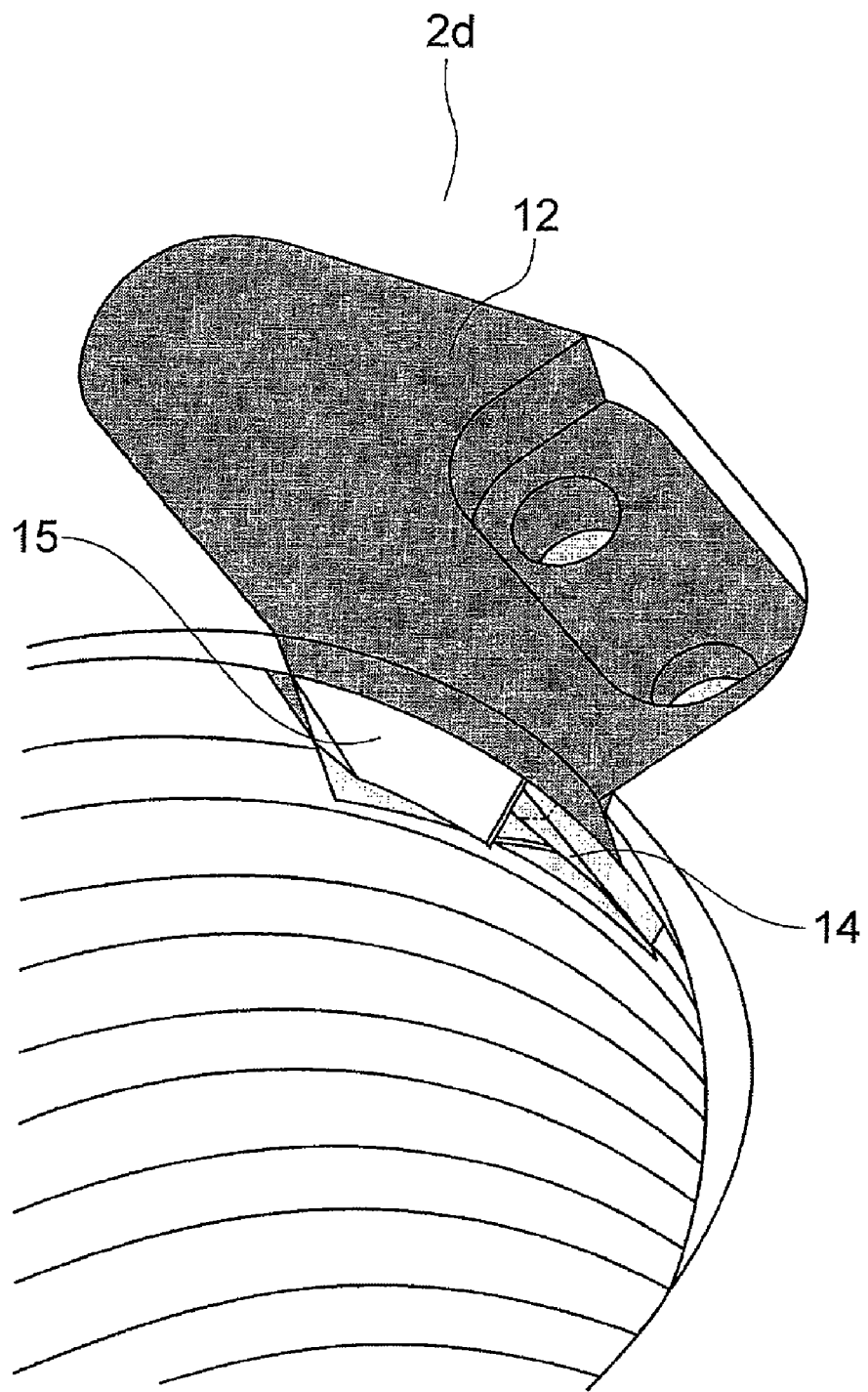
FIG. 10 is a perspective view of the nut on which the direction change path component is mounted.
Figure 11:
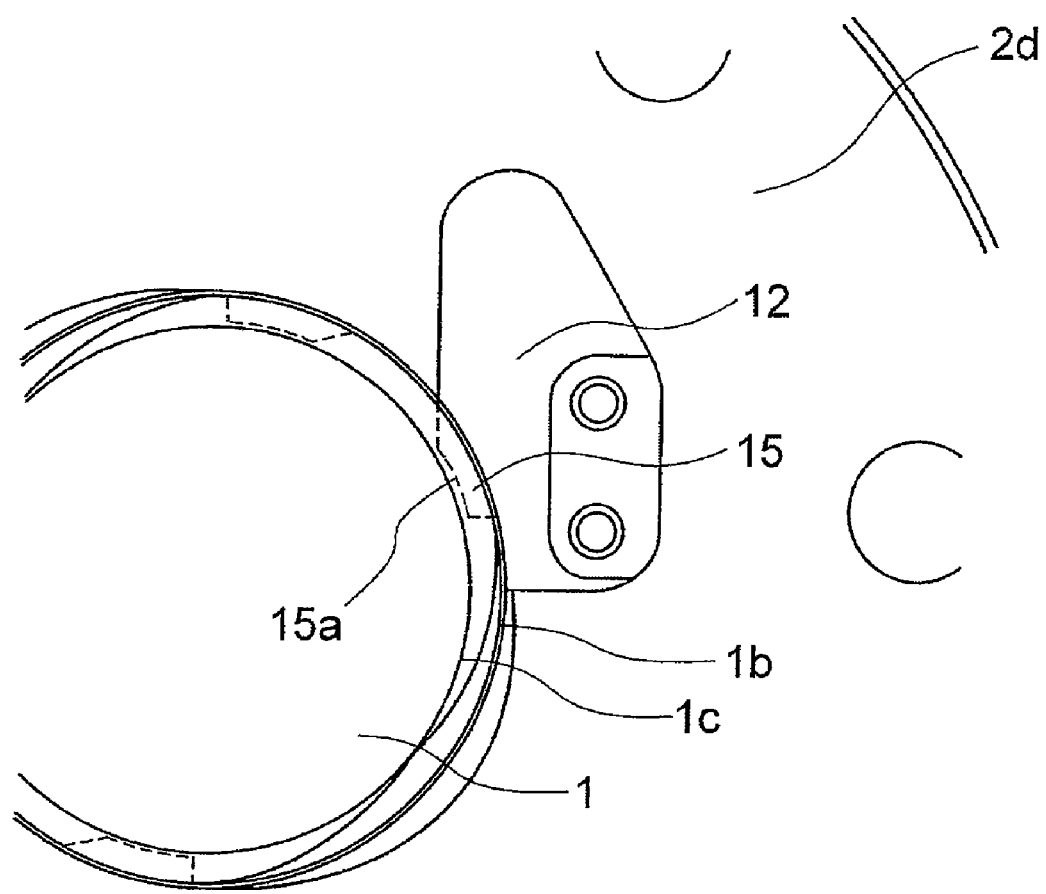
FIG. 11 is a front view of the nut on which the direction change path component is mounted.

FIGS. 10 and 11 illustrate the direction change path component 12 mounted on the end surface 2d of the nut 2. When the direction change path component 12 is mounted on the nut 2, the mountain-shaped lip portion 15 juts inside of the thread of the loaded roller rolling surface 1a of the nut 2, or to the screw shaft 1 side. It is placed to the screw bottom 1c side rather than the thread 1b of the roller rolling surface 1a of the screw shaft 1, and it does not come into contact with the screw bottom 1c. The apex 15a of the lip portion 15 goes along the spiral line of the roller rolling surface 1a of the screw shaft 1. The curvature radius of the apex 15a seen in the axial direction of the screw shaft 1 is larger than the radius of the screw bottom 1c and smaller than the curvature radius of the thread 1b.

Figure 12:
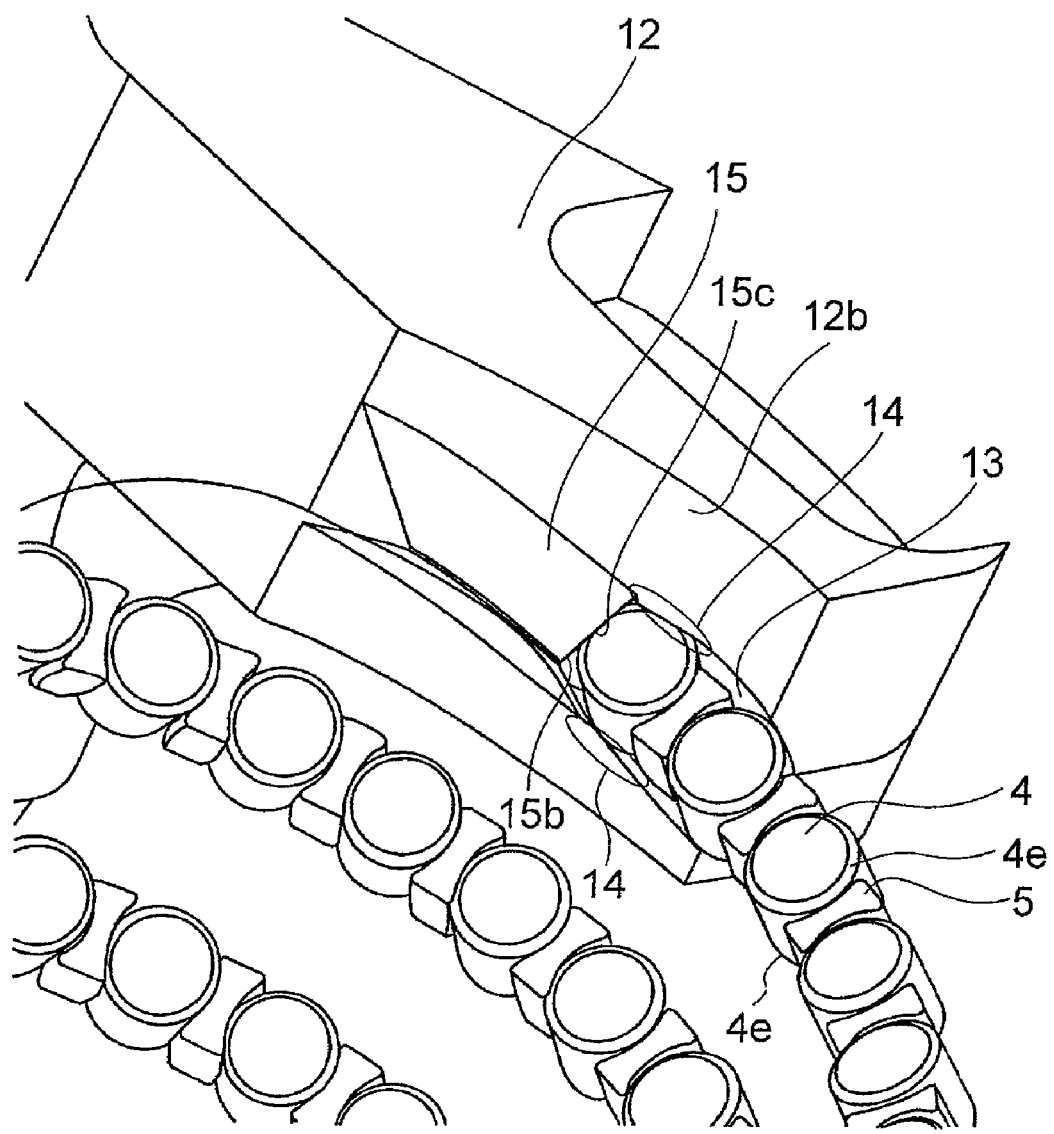
FIG. 12 is a perspective view illustrating retainers and rollers moving in the spiral loaded roller rolling path.

FIG. 12 illustrates the rollers 4 and the retainer 5 moving in the spiral loaded roller rolling path 6 and being scooped up by a pair of diagonal corresponding parts 14 and the lip portion 15. The width between the paired diagonal corresponding parts 14 becomes narrower as they are deeper in the direction change path 7. The opposed surfaces 12b of the screw shaft 1 side of the direction change path component 12 is a curved surface that forms a part of the cylinder while the width between the paired diagonal corresponding parts 14 becomes narrower spontaneously by extending the continuous path 13 straight. The rollers 4 are guided into the direction change path 7 as they are held at the diagonal parts 4e by the paired diagonal corresponding parts 14.

The retainer 5 interposed between the rollers 4 usually circulates in the same circulation raceway as that of the rollers 4. However, when there is space between the roller 4 and the retainer 5, the retainer 5 sometimes gets out of the normal circulation raceway. The lip portion 15 scoops the retainer 5 out of the circulation raceway and guides it into the direction change path 7. The inner wall surface 15b of the lip portion 15 is away from the raceway of the rollers and is kept out of contact with the rollers 4. Therefore, the rollers 4 are in contact with the edge 15c at the loaded roller rolling path side of the lip portion 15 and the edge 15c can be prevented from being broken.

FIGS. 13A and 13B illustrate scooping of the roller 4 by the paired diagonal corresponding parts 14 (FIG. 13A illustrating the roller 4 that is started to be scooped and FIG. 13B illustrating the roller 4 that is being scooped). When the roller 4 moves from the loaded roller rolling path 6 to the direction change path 7, the diagonal corresponding parts 14 provided in the R piece 10 and end piece 11 sandwich the diagonal parts 4e of the roller and guide it into the direction change path 7. The width between the paired diagonal corresponding parts 14 becomes gradually narrower as it goes deeper inside of the direction change path 7 in such a manner that the cross section of the direction change path 7 formed by the continuous path 13 and the paired diagonal corresponding parts 14 becomes close to a rectangle gradually. Therefore, the contact surface between the diagonal part 4e of the roller 4 and the diagonal corresponding part 14 becomes gradually larger and the roller 4 can come into the inside of the direction change path 7 easily.

Figure 14A:
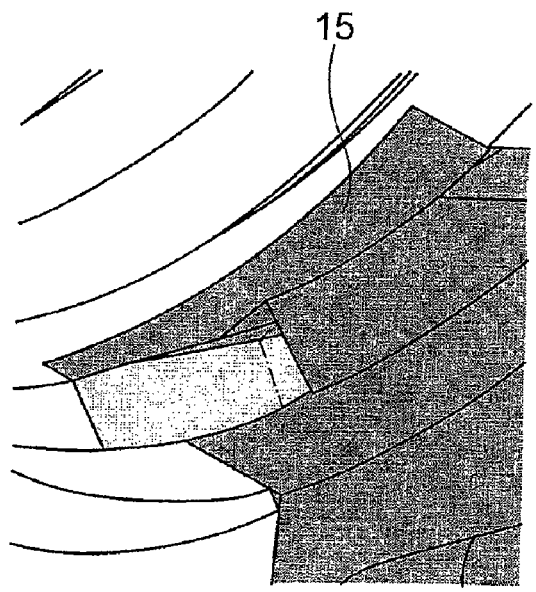
FIGS. 14A and 14B are perspective views each illustrating a lip portion (FIG. 14A illustrating combination of the R piece and the end piece and FIG. 14B illustrating the lip portion from which the end piece is removed).
Figure 14B:
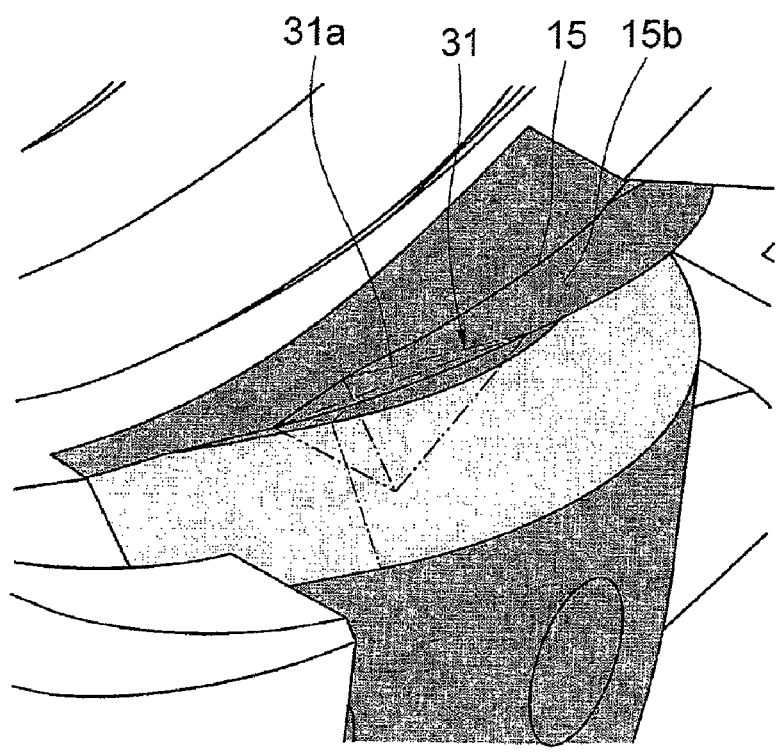

FIGS. 14A and 14B illustrate a lip portion 15. FIG. 14A illustrates combined R piece 10 and end piece 11, and FIG. 14B illustrates the lip portion 15 from which the end piece 11 is removed. The inner wall surface 15b of the lip portion is formed to be tapered in a side surface 31a that forms a virtual trial pole of FIG. 14B. The inner wall surface 15b of the lip portion 15 is tapered in such a manner that the cross sectional area of the direction change path 7 becomes gradually larger from the direction change path 7 to the loaded roller rolling path 6. This is to prevent the rollers 4 from coming into contact with the inner wall surface 15b of the lip portion 15. Here, if the inner wall surface 15b of the lip portion 15 is tapered, the apex of the edge of the lip portion 15 may be sometimes displaced.

Figure 15:
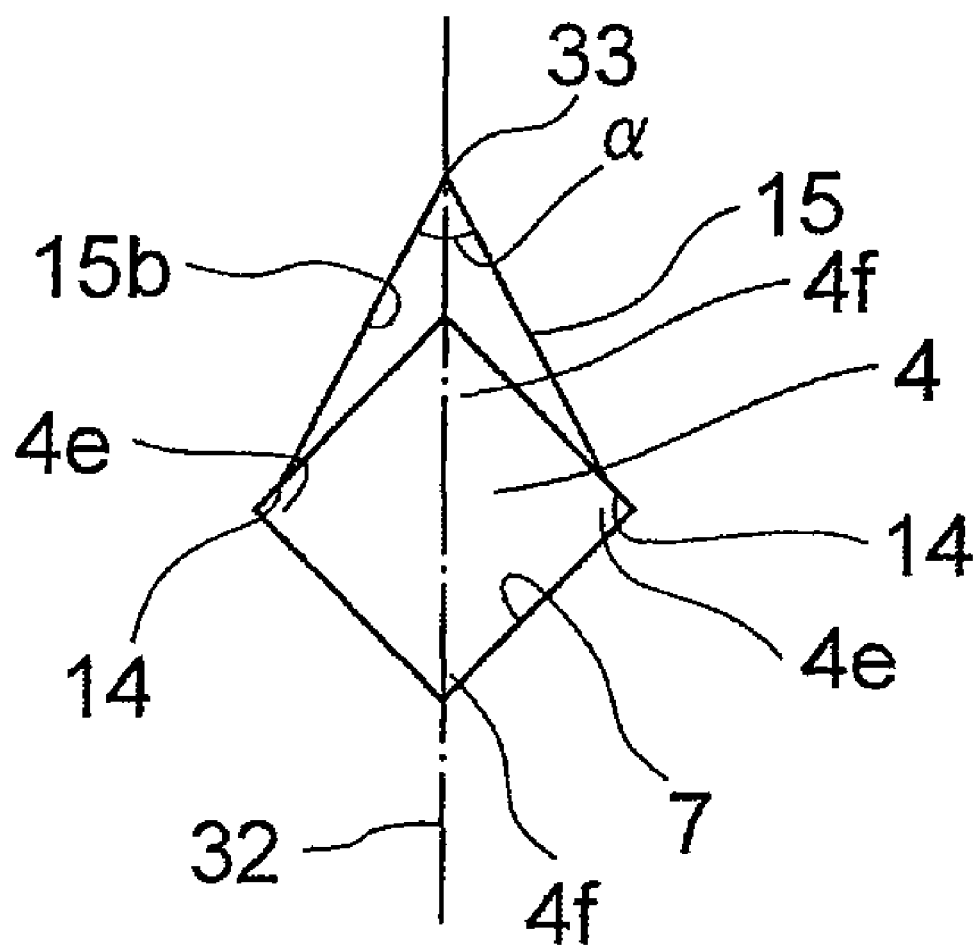
FIG. 15 is a cross sectional view of an inner wall surface of the lip portion.

FIG. 15 illustrates a cross section of the inner wall surface 15b of the lip portion 15. The above-described tapered inner wall surface 15b of the lip portion 15 is formed into V shape in such a manner that an apex angle α formed by connecting the inner walls of the paired diagonal corresponding parts 14 and an apex 33 on the diagonal line 32 connecting diagonal parts 4f of the roller 4 scooped by the paired diagonal corresponding parts 14, which diagonal parts 4f are out of contact with the paired diagonal corresponding parts, is less than 90 degrees.

Figure 16:
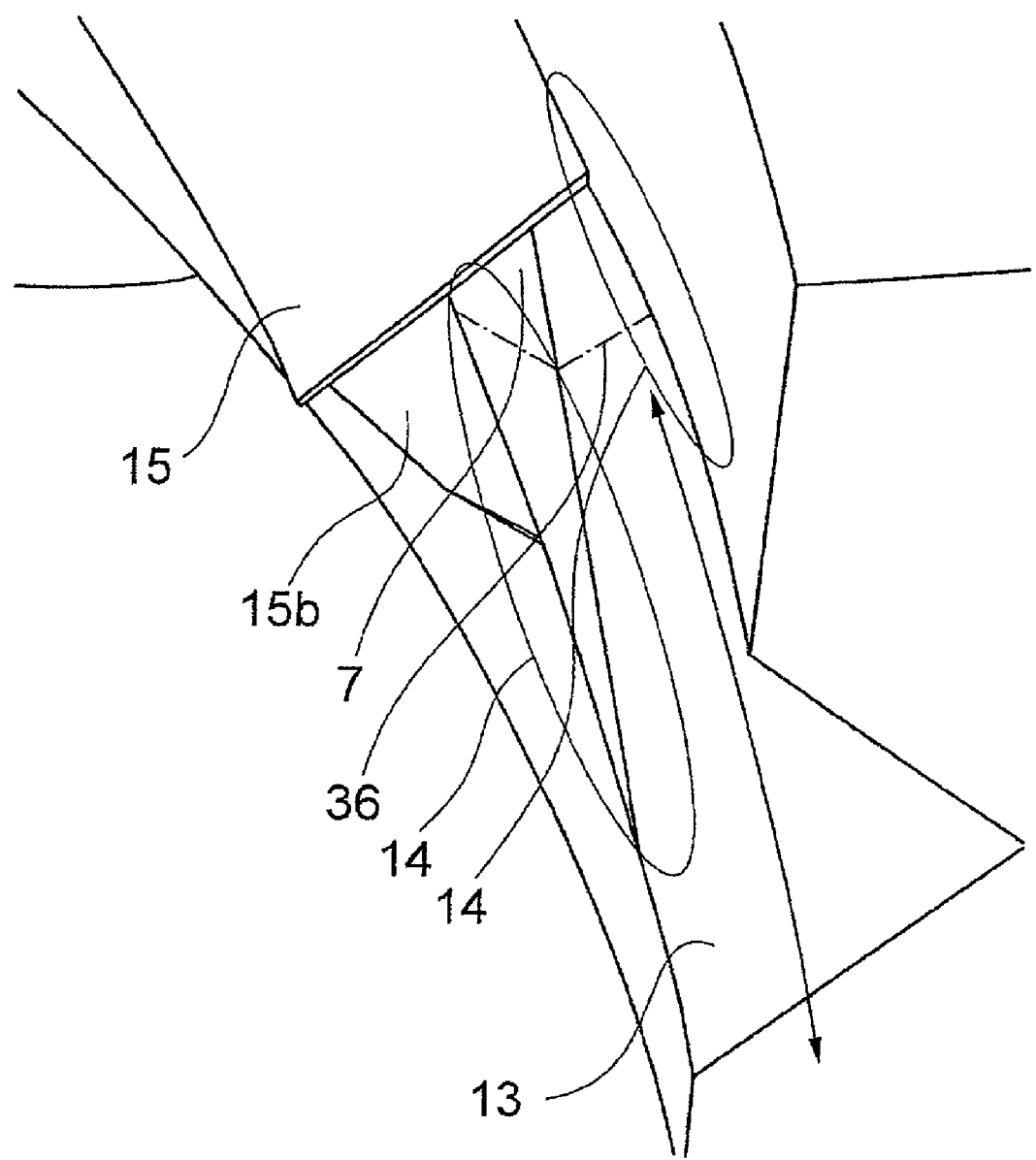
FIG. 16 is a perspective view of the lip portion and diagonal corresponding parts.

FIG. 16 is a detail perspective view of the lip portion and the diagonal corresponding parts 14. The roller 4 is scooped up by the diagonal corresponding parts 14 formed at the end of the continuous path 13. The width between the paired diagonal corresponding parts 14 becomes narrower as they are deeper in the continuous path 13 and finally they are connected to each other with no space therebetween. The retainer 5 away from the circulation raceway is scooped up into the direction change path 7 in contact with the inner wall surface 15b of the lip portion 15. The roller does not come into contact with the inner wall surface 15b of the lip portion 15. The dashed line in the figure indicates the boundary between the arc part and the straight part of the continuous path 13.

Figure 17:
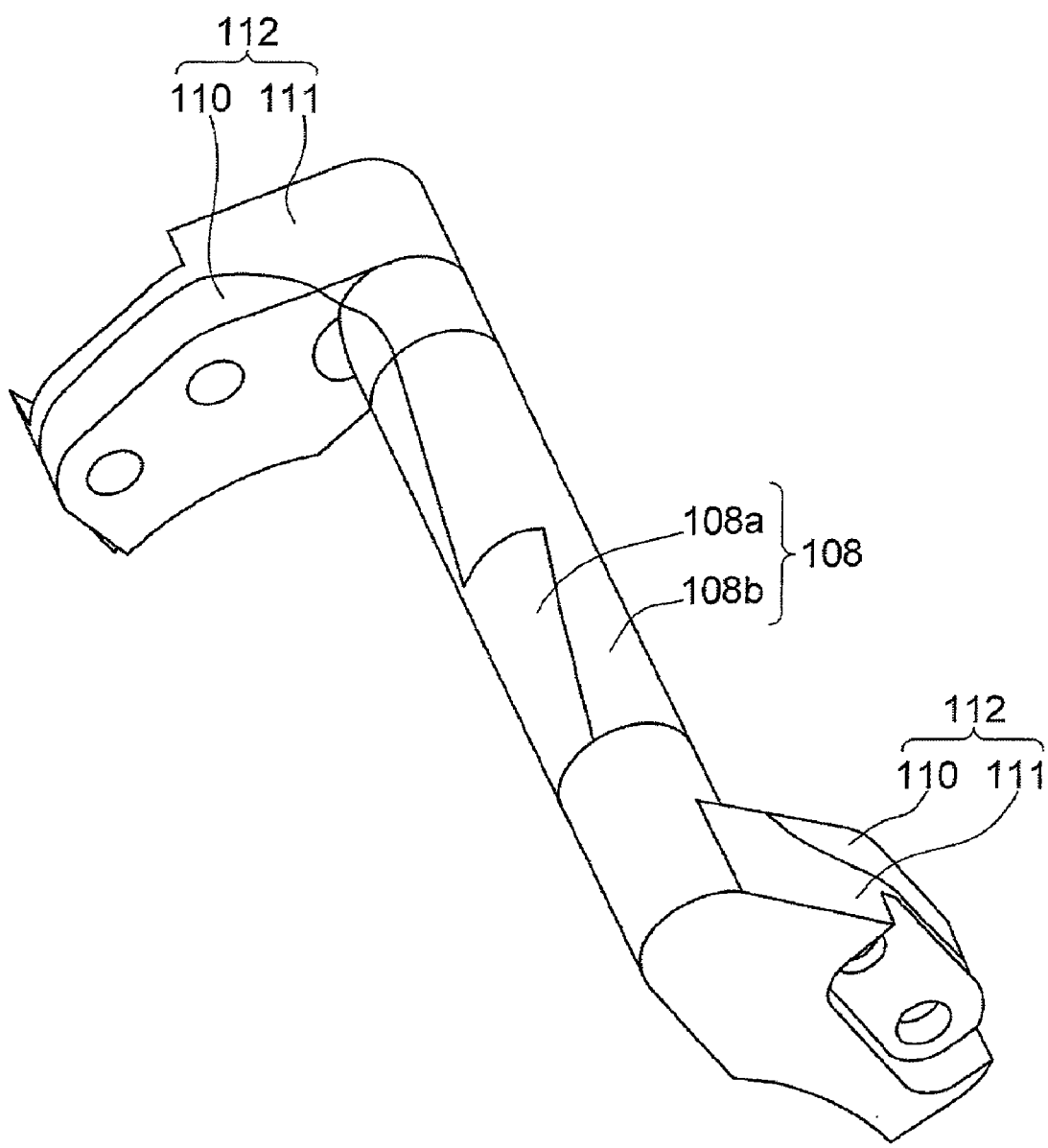
FIG. 17 is a perspective view of another example of the circulation member.
Figure 18:
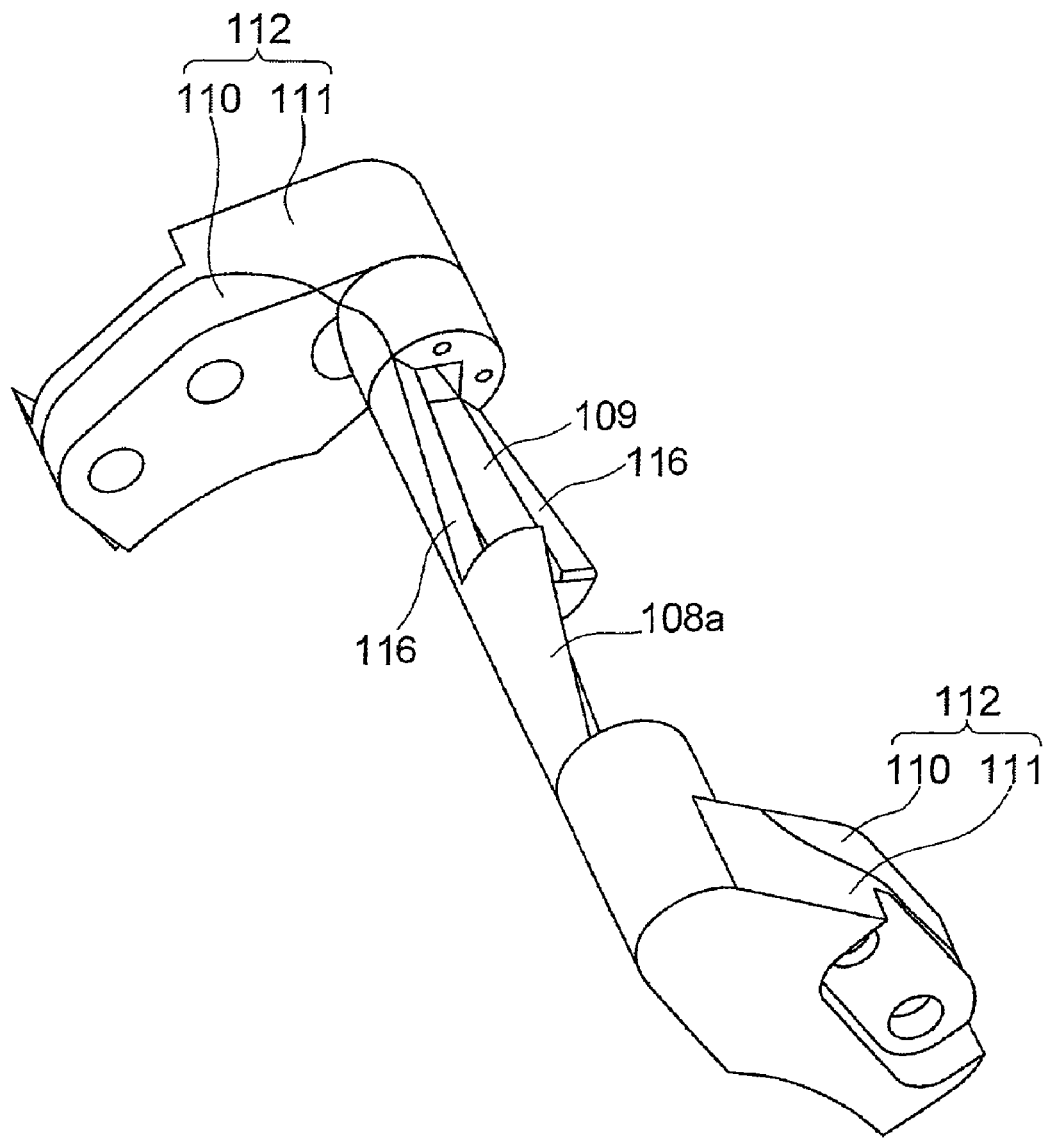
FIG. 18 is a perspective view of the circulation member (split piece).

FIGS. 17 and 18 illustrate other examples of the circulation member to be mounted on the nut 2. The circulation member 3 has a circulation pipe 108 to be inserted into a through hole extending in the axial direction of the nut 2 and a pair of direction change path components to be mounted to the respective ends of the circulation pipe 108 in the axial direction. In the circulation member 3, an unloaded return path is formed connecting one end of the loaded roller rolling path 6 to the other. The unloaded return path has a straight path 109 extending straight in parallel with the center line of the nut 2 (see FIG. 23) and a pair of curved direction change paths which are connected to the respective ends of the straight path 109 and formed in the paired direction change path components 112. Once each roller 4 moves up to an end of the loaded roller rolling path 6, it is guided into the direction change path of the circulation member 3, passes through the straight path 109 and the opposite direction change path and is returned to the other end of the loaded roller rolling path 6.

The circulation pipe 108 is combination of two split pieces 108a and 108b. FIG. 18 illustrates the circulation pipe 108 from which one split piece 108b is removed. Inside the circulation pipe 108, a straight path 109 is formed straight in parallel with the axial direction of the nut 2. This straight path 109 is twisted so that the attitude of each roller 4 moving in the straight path 109 can be rotated. As the attitude of the roller is rotated in the straight path 109, it becomes possible to return the roller 4 scooped from an end of the loaded roller rolling path 6 to the other end of the loaded roller rolling path 6 with the attitudes of the roller 4 at the respective ends of the loaded roller rolling path 6 matched to each other.

The mating surfaces of the split pieces 108a and 108b are on the diagonal line of the straight path 109 of rectangular cross section. As the straight path 109 is twisted, the apexes of the rectangle for the mating surfaces 116 are changed at a midpoint in the axial direction of the circulation pipe 108. This is to prevent occurrence of undercut when the twisted straight path 109 is formed in the split pieces 108a and 108b. In each end surface of the circulation pipe 108 in the axial direction, a positioning hole is formed for positioning of the circulation pipe.

Figure 19:
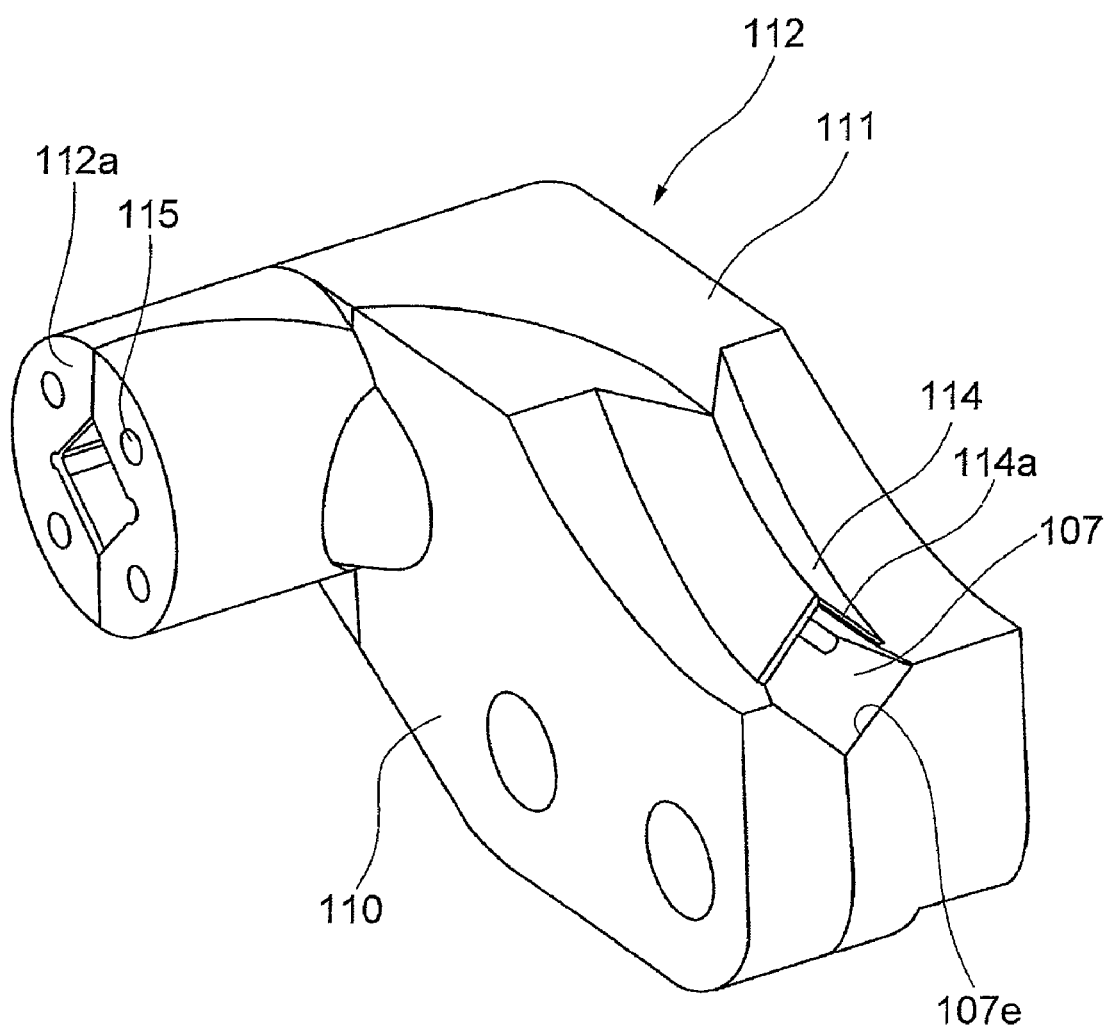
FIG. 19 is a perspective view of a direction change path component.

The direction change path component 112 is mounted on an end surface of the nut 2. FIG. 19 illustrates a perspective view of the direction change path component. The direction change path component 112 has combination of an R piece 110 that forms the inner peripheral side of the direction change path and an end piece 111 that forms the outer peripheral side of the direction change path 107.

In the direction change path component 112, a V-shaped mountain-like lip portion 114 is provided which juts toward the roller rolling surface 1a of V-shaped cross section of the screw shaft 1 and scoops the rollers 4 moving in the loaded roller rolling path 6 up into the direction change path. When the direction change path component 112 is mounted on the nut 2, the edge 114a of the lip portion 114 is placed close to the roller rolling surface 1a of V-shaped cross section of the screw shaft 1. The end 107e of the direction change path 107 at the opposite side to the lip portion 114 is continuous to the loaded roller rolling surface 2a of V-shaped cross section of the nut 2. In the contact surface 112a of the direction change path component 112 with the circulation pipe 108, a positioning bore 115 is formed. As a positioning pin is inserted into the positioning bore 115 of the direction change path component 112 and the circulation pipe 108, they can be positioned.

Figure 20:
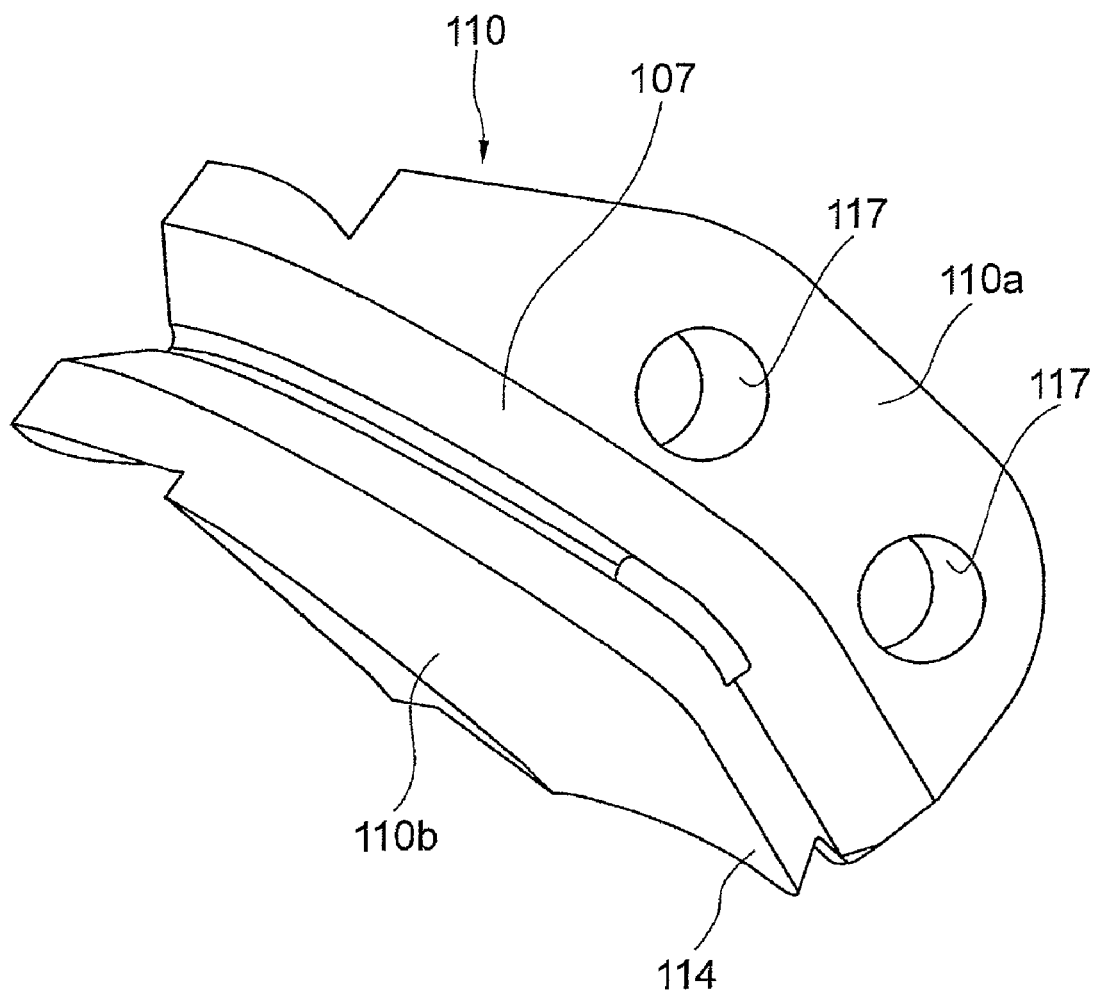
FIG. 20 is a perspective view of an R piece.
Figure 21:
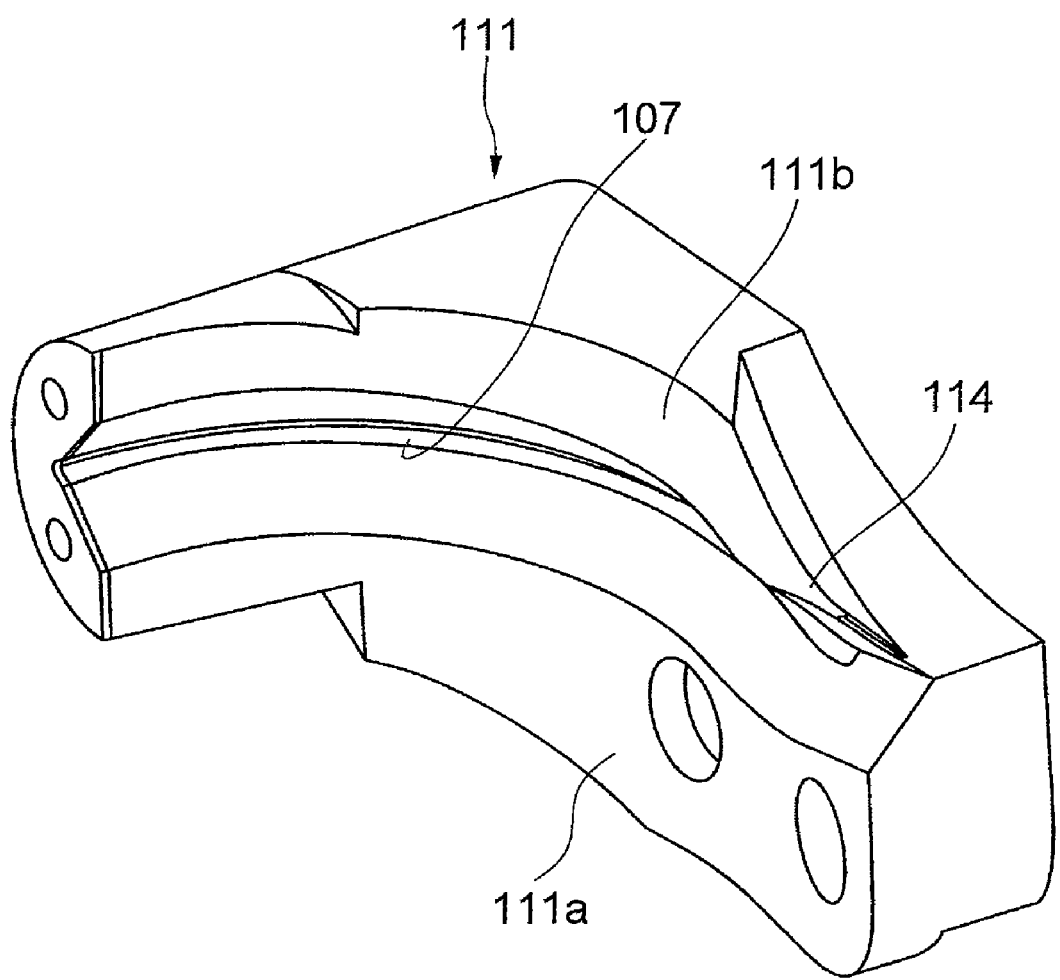
FIG. 21 is a perspective view of an end piece.

FIG. 20 is a perspective view of the R piece 110 and FIG. 21 is a perspective view of the end piece 111. The direction change path 107 is curved, but not twisted. The direction change path component 112 is divided into the inner peripheral side R piece 110 and the outer peripheral side end piece 111 along the diagonal line of the direction change path 107 of rectangular cross section. As illustrated in FIG. 20, the R piece 110 has a flange portion 110a for mounting on the end surface of the nut 2 and a main body portion 110b where the direction change path 107 is formed. In the flange portion 110a, a mounting hole 117 is formed for mounting the R piece 110 on the nut 2. At a part of the flange portion 110a where the direction change path 107 is formed, a half of the lip portion 114 is formed for scooping the rollers 4 moving in the loaded roller rolling path 6. The R piece 110 may be manufactured by metal cutting or resin molding.

As illustrated in FIG. 21, the end piece 111 has a flange portion 111a which is mounted on the end surface of the nut 2 and a main body portion 111b with the direction change path 107 formed therein. In the portion of the flange portion 111a where the direction change path 107 is formed, a half of the lip portion 114 for scooping up the rollers 4 moving in the loaded roller rolling path 6 is formed. The end piece 111 may be formed by cutting of metal or resin molding.

Figure 22:
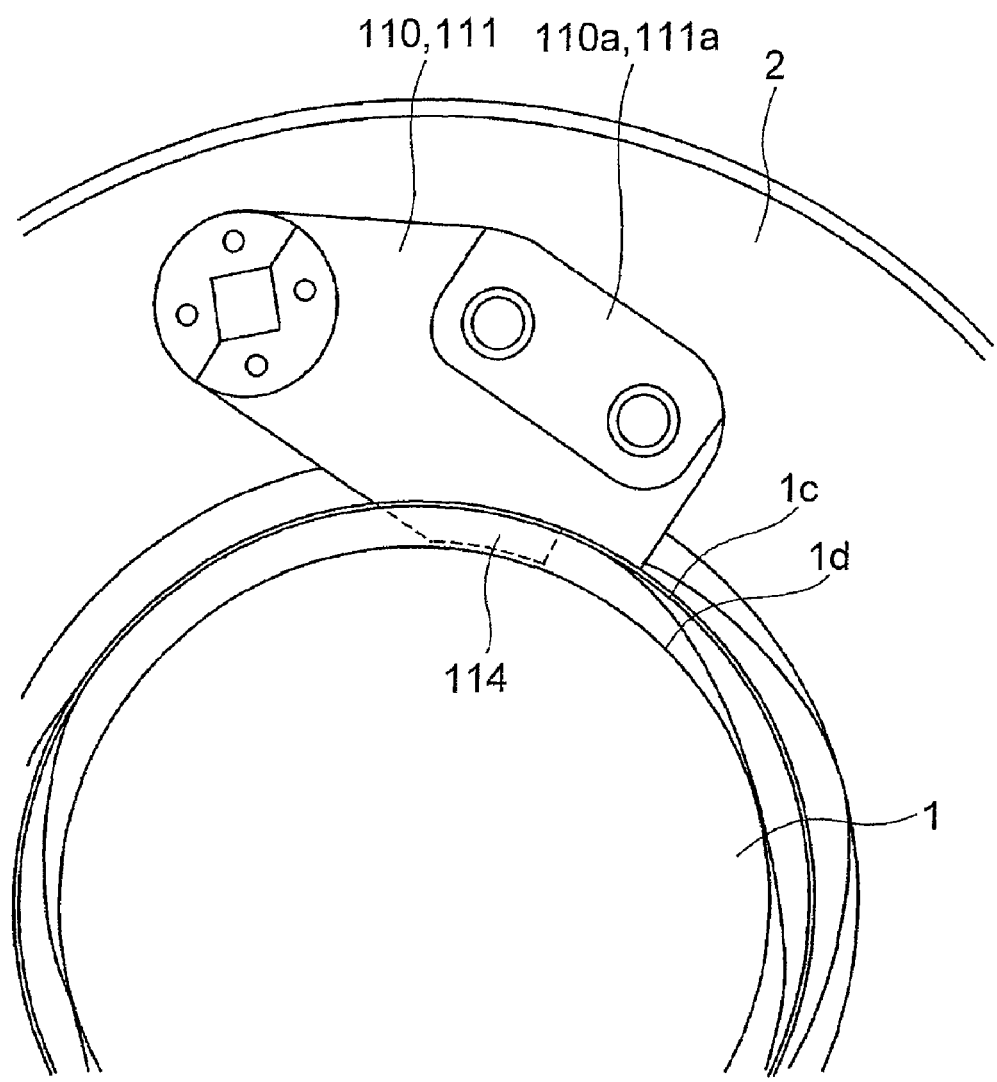
FIG. 22 illustrates the R piece and the end piece mounted on the nut.

As illustrated in FIG. 22, the R piece 110 and the end piece 111 are superposed together a bolt (not shown) is inserted into their flange portions 110a and 111a and the bolt is fit in the end surface of the nut 2 thereby to mount the direction change path component 112 on the nut 2. When the direction change path component 112 is mounted on the nut, the lip portion 114 is placed inside of the thread 1c of the roller rolling surface 1a of the screw shaft, however, it does not come into contact with the screw bottom 1*d* of the roller rolling surface 1*a*.

Figure 23:
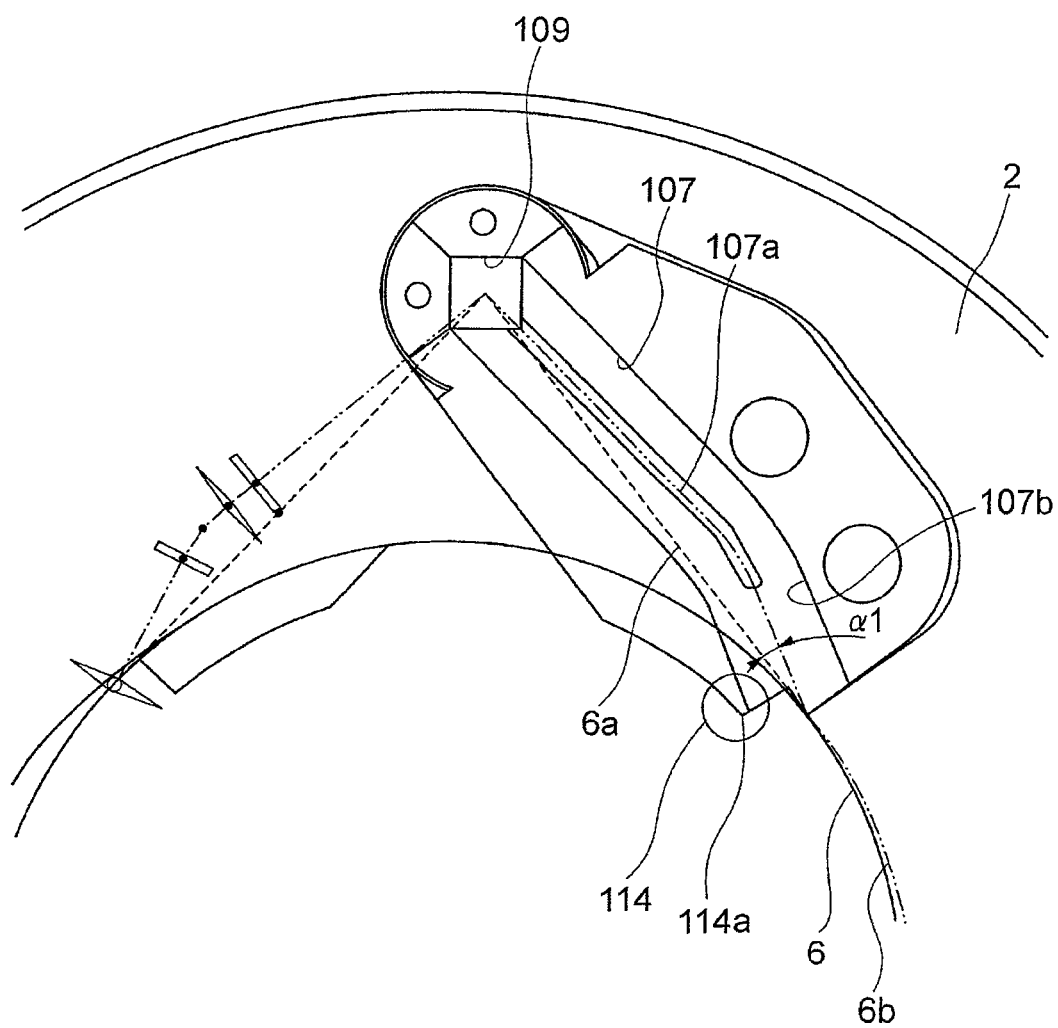
FIG. 23 illustrates a structure of the direction change path seen in the axial direction of the screw shaft.

FIG. 23 illustrates a structure of the direction change path 107 seen in the axial direction of the screw shaft 1. In FIG. 23, the end piece 111 is removed. The chain double-dashed line in the figure indicates the center line 107*a* of the direction change path 107 and the broken line indicates the tangential direction 6*a* of the loaded roller rolling path 6. The direction change path 107 has a scooping path 107*b* where a lip portion 114 is formed. At the connecting point which is a boundary between the loaded roller rolling path 6 and the unloaded return path, the center line 107*a* of the scooping path 107*b* connected to the loaded roller rolling path 6 is placed outside of the tangential direction 6*a* of the center line 6*b* of the loaded roller rolling path 6, that is, inside of the nut 2. In other words, the moving direction inside the scooping path 107*b* of each roller 4 moving from the loaded roller rolling path 6 to the scooping path 107*b* is directed to the outside of the tangential direction of the loaded roller rolling path 6. Then, in order to connect the scooping path 107*b* to the straight path 109, the direction change path 107 is curved into an arc at a midpoint to the straight line 109 and is connected to the end of the straight path 109. After the center line 107*a* of the direction change path 107 is designed as described above, the roller 4 is moved along the center line 107 thereby to be able to design the direction change path 107. Here, the center line 10 of the direction change path 107 seen in the side surface direction of the screw shaft 1 is direction in the lead direction of the screw shaft 1.

As the moving direction of each roller 4 inside the scooping portion 107*b* is directed outside of the tangential direction 6*a*, the edge 114*a* of the lip portion 114 can be extended toward the loaded roller rolling path 6 while the enough thickness of the lip portion 114 is assured. With this structure, the unconstrained area of the roller 4 from the loaded roller rolling path 6 into the lip portion 114 is shortened and it becomes possible to prevent skewing of the roller 4 in the unconstrained area.

Figure 24:
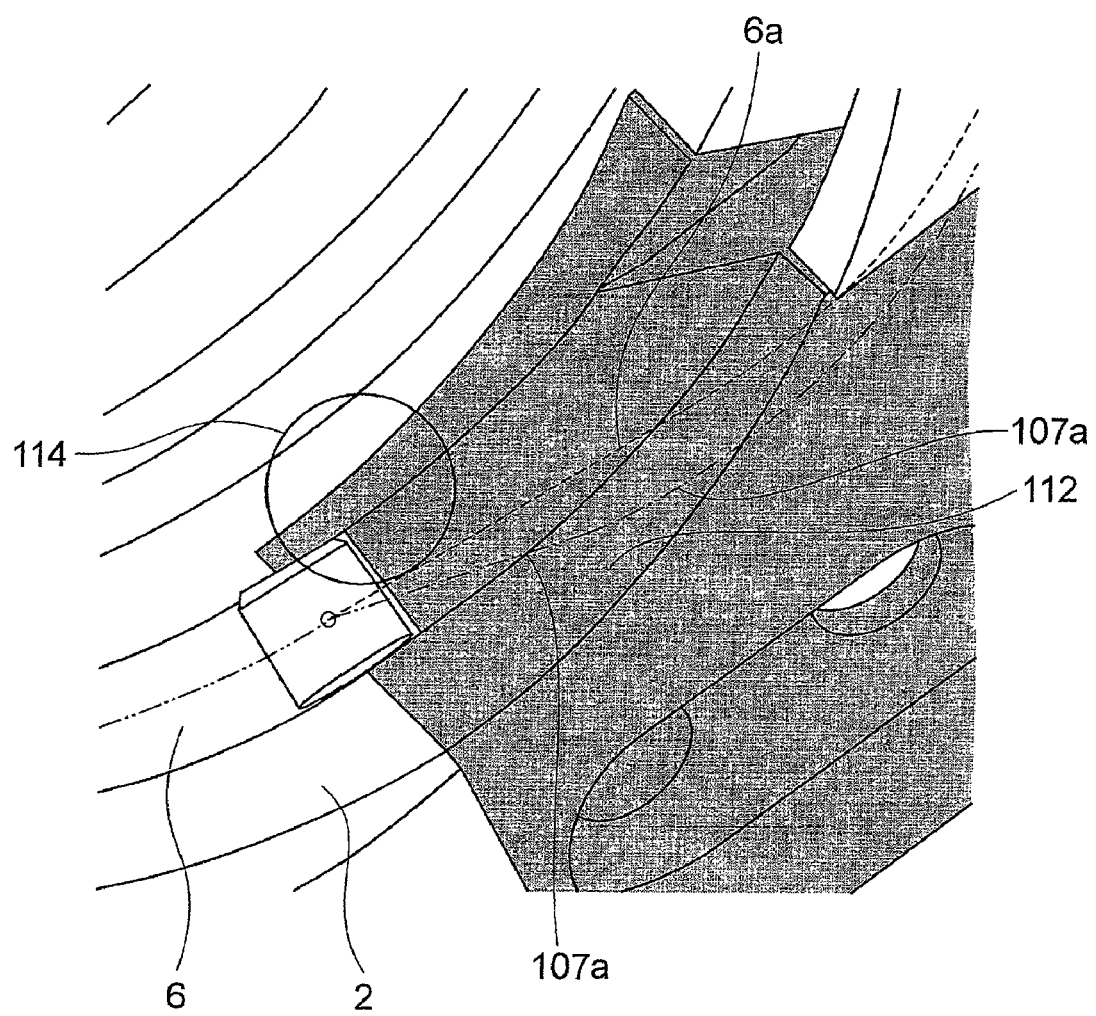
FIG. 24 is a perspective view illustrating scooping of the roller by lip portion.
Figure 25:
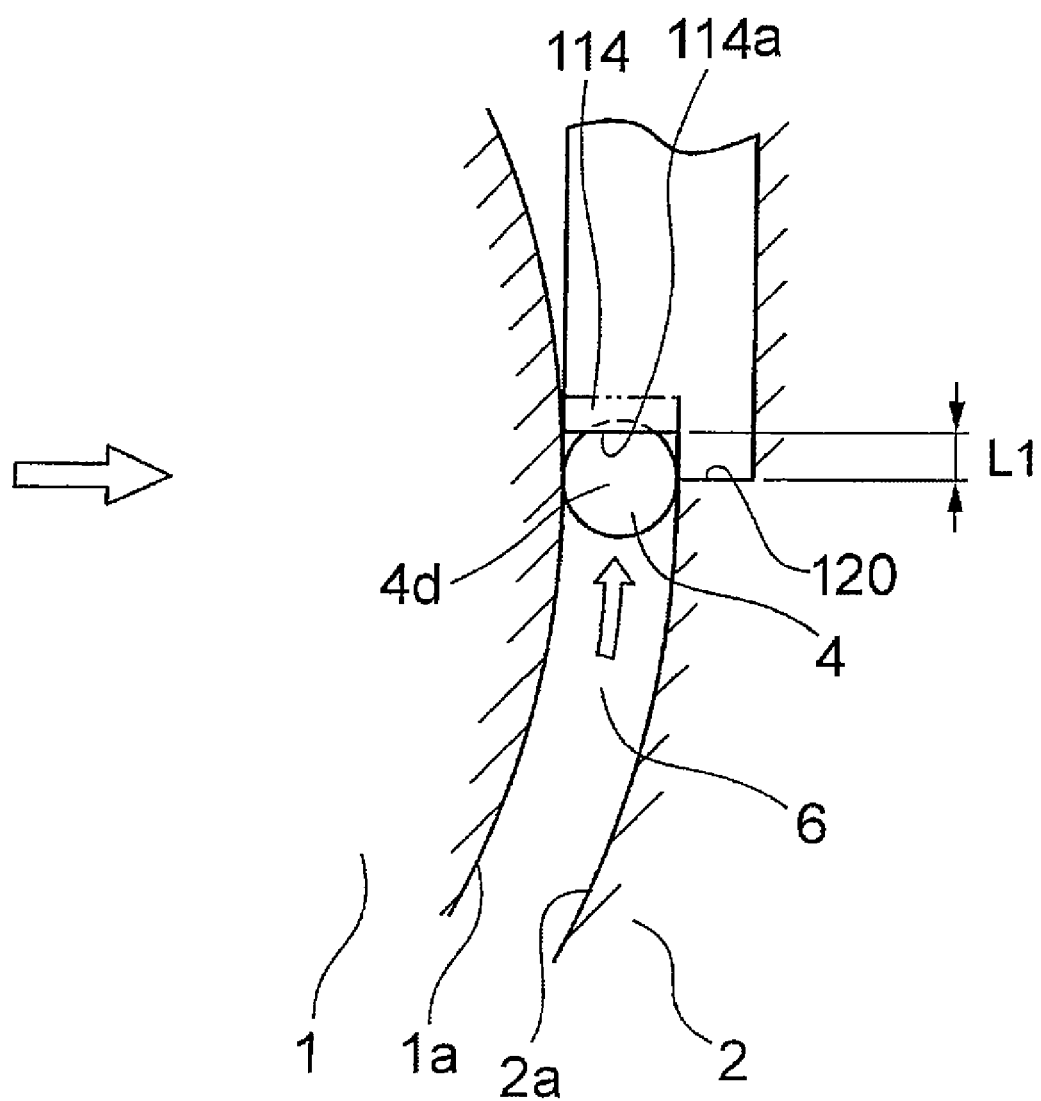
FIG. 25 is a schematic view illustrating scooping of the roller by the lip portion (view seen in the axial direction of the screw shaft).

FIG. 24 illustrates the raceway of each roller 4 scooped up by the lip portion 114. In the loaded roller rolling path 6, the roller 4 rolls in line contact with the two points of the roller rolling surface 1*a* of the screw shaft 1 and the loaded roller rolling surface 2*a* of the nut 2. Once the roller 4 is moved up to an end of the loaded roller rolling path 6, it enters the lip portion 114. There, just before the roller 4 gets out of the loaded roller rolling path 6, its end in the moving direction enters the lip portion 114. To be exact, as illustrated in FIG. 25, when the center 4*d* of the roller 4 is positioned at the transition point from the loaded roller rolling path 6 to the unloaded return path, the edge 114 of the lip portion 114 covers the end of the roller 4 in the moving direction. In other words, the distance L1 from the boundary 120 between the loaded roller rolling path and the unloaded return path to the lip portion 114 (see FIG. 25) is smaller than the radius of the roller 4. The angle α1 of the center line 107*a* of the scooping path 107*b* relative to the tangential direction 6*a* (see FIG. 23) is set to such an angle that the edge 114*a* of the lip portion 114 covers the end of the roller 4 in the moving direction.

As illustrated in FIG. 25, the roller 4 enters the lip portion 114 while it keeps the attitude inside the loaded roller rolling path 6. Therefore, it is possible to prevent skewing of the roller 4 moving from the loaded roller rolling path 6 to the lip portion 114. When the roller 4 enters the lip portion 114, the edge 114*a* of the lip portion 114 is out of contact with the roller 4. Therefore, it is possible to prevent damage to the edge 114*a* of the lip portion 114. When the roller 4 further comes into the lip portion 114, the inner wall surface of the lip portion 114 comes into contact with the side surface of the roller 4 and it guides the roller 4 into the direction change path 107.

Figure 26:
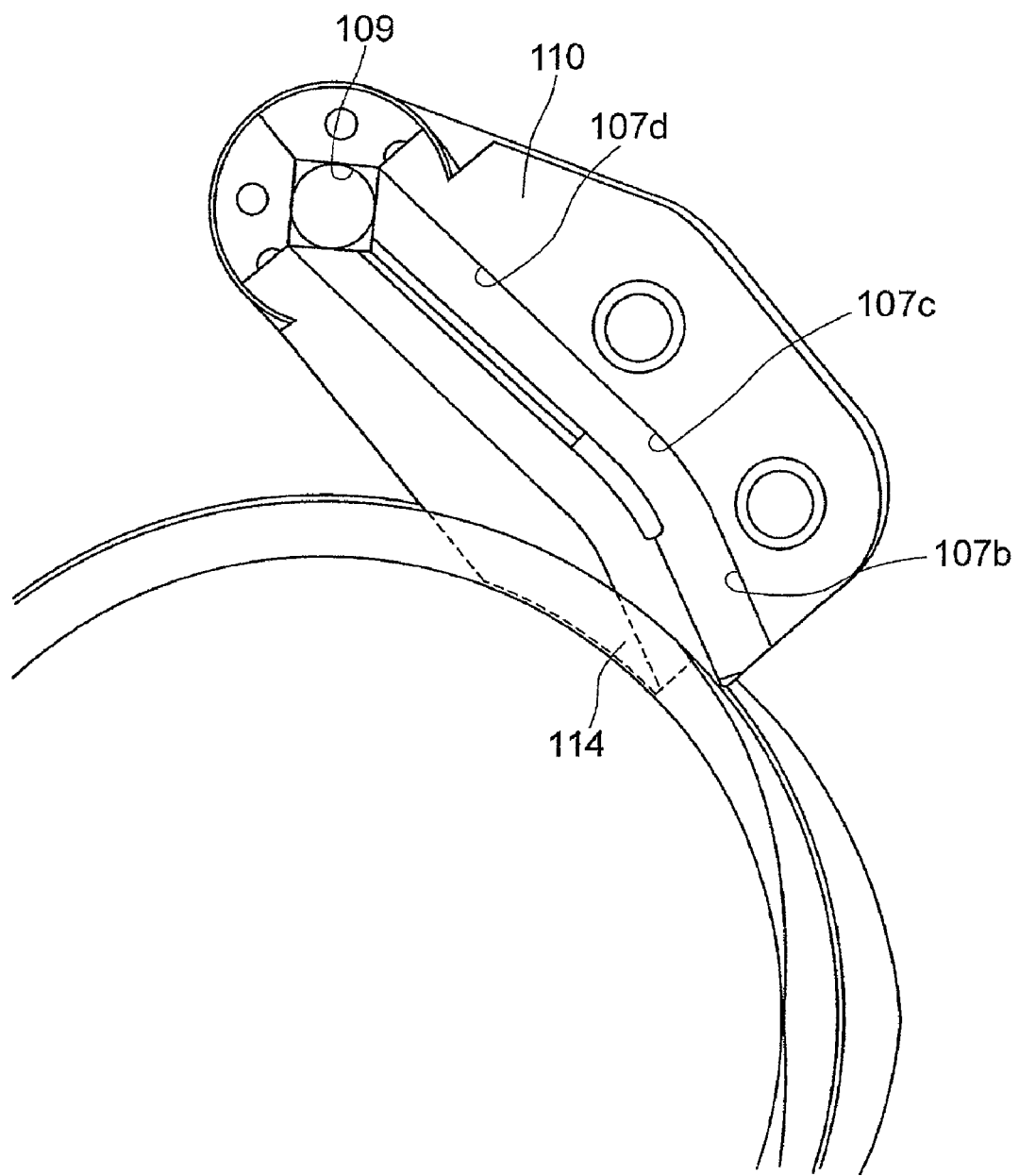
FIG. 26 illustrates a direction change path formed in the R piece.
Figure 27:
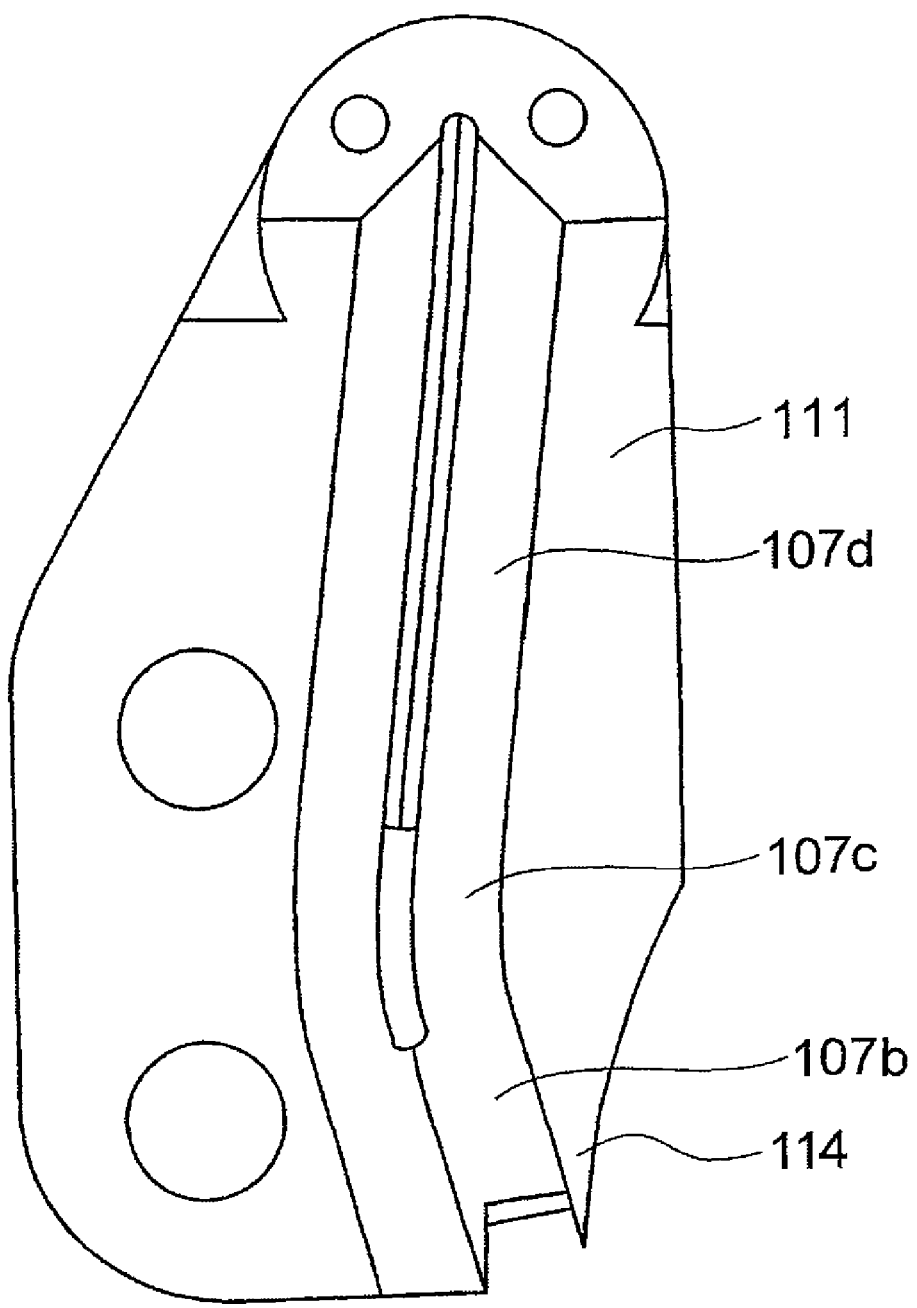
FIG. 27 illustrates a direction change path formed in the end piece.
Figure 30:
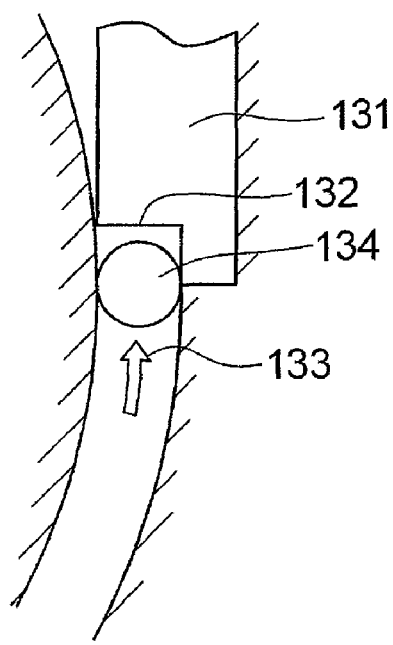
FIG. 30 illustrates scooping of the circulation member seen in the axial direction of the screw shaft (conventional example).
Figure 31:
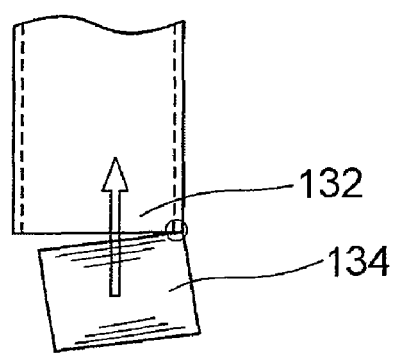
FIG. 31 is a schematic diagram illustrating contact between the scooping portion and the roller (conventional example).

FIGS. 26 and 27 illustrate the direction change path 107 formed in the R piece 110 and the end piece 111. The direction change path 107 of the R piece 110 and the end piece 111 has the scooping portion 107*b* directed outside of the tangential direction 6*a* of the loaded roller rolling path 6, a bent intermediate path 107*c* and a communication path 107*d* connecting the intermediate path 107*c* to the straight path 109.

FIGS. 28A and 28B are side views of a roller 4, 121 moving in the circulation path. The roller 4 in FIG. 28A has spherical end surfaces and the roller 121 in FIG. 28B has circularly chamfered end surfaces 121*a*. When the roller 121 with chamfered end surfaces is used to circulate, it is constrained at the edge 114*a* of the lip portion 114 more securely. This reveals that the roller 4 can move smoothly when it has spherical end surfaces. In addition, when the end surface 4*a* of the roller 4 is spherical, the curvature radius of the end surface 4*a* becomes larger than that of the circularly-chamfered roller 4. Inclination of the tangential direction 4*f* of the end surface 4*a* at the elevation change can be smaller than the inclination 121*e* of the roller 121 also when the roller moves on the elevation change between the components. Hence, the roller 4 is prevented from being caught in the elevation difference. Here, when the end surface 4*a* of the roller is spherical, the roller 4 becomes easy to be inclined and therefore, it is preferable that the retainer is interposed between adjacent rollers 4 to prevent skewing.

FIG. 29 illustrates another example of the lip portion 114. The lip portion 114 forms a mountain by combining a first wall part 126*b* and a second wall part 126*a* at the apex 126*c*. The first wall part 126*b* is positioned to the end surface side of the roller and the second wall part 126*a* is positioned to the side surface side of the roller 4. The first wall part 126*b* is cut short. The edge 128*b* of the first wall part 126*b* is shifted from the edge 128*a* of the second wall part 126*a*, which starts at the apex 126*c*, and the edge 128*b* is away from the loaded roller rolling path 6 more than the edge 128*a* of the second wall part 126*a*. Thus, as the length of the lip portion 114 is differentiated between the end surface side and side surface side of the roller 4, it becomes possible to constrain first the side surface of the roller 4 and then the end surface of the roller 4. When the end surface of the roller 4 abuts against the lip portion 114, the lip portion 114 may be damaged. As the side surface of the roller 4 is first constrained and then, after the angle of the end surface of the roller 4 is maintained constant the end surface of the roller 4 is constrained thereby to prevent damage to the lip portion 114.

The present invention is not limited to the above-mentioned exemplary embodiments and may be embodied in various forms without departing from the scope of the invention. For example, the continuous path of the direction change path component may extend directed outside not of the tangential direction of the loaded roller rolling path of the nut, but of tangential direction seen in the axial direction of the nut. With this structure, the paired diagonal corresponding parts can hold the diagonal parts of the rollers more stably and also the rollers that have just got out of the loaded roller rolling path.

The circulation member is not limited to such an endcap type circulation member as in the embodiments and may be a return pipe formed by bending both ends of a pipe. Besides, the rollers may be parallel-arranged with axis lines of the adjacent rollers kept in parallel with each other, or may be cross-arranged with the axis lines orthogonal to each other. Each roller used may be a tapered roller having tapered side surfaces instead of a cylindrical roller. Further, the axis lines of plural rollers parallel-arranged in the respective two roller rolling surfaces may be directed in the same direction. Furthermore, for example, the scooping portion may not be the lip portion jutting to the screw shaft side as described above but a boat-bottom shaped scooping portion for scooping the parts on the diagonal line of the roller as a boat-bottom scooping of a ball screw.

The present application is based on Japanese Patent Application Nos. 2007-286791 filed on Nov. 2, 2007 and 2007-286792 filed on Nov. 2, 2007, and their contents are incorporated by reference herein.

The invention claimed is:

1. A roller screw comprising:
a screw shaft having a spiral roller rolling surface formed on an outer peripheral surface of the screw shaft;
a nut having a loaded roller rolling surface formed in an inner peripheral surface of the nut, facing the roller rolling surface of the screw shaft;
a circulation member provided on the nut and having an unloaded return path connecting one end of the loaded roller rolling surface of the nut to an opposite end thereof;
a plurality of rollers arranged in a loaded roller rolling path between the roller rolling surface of the screw shaft and the loaded roller rolling surface of the nut and in the unloaded return path of the circulation member; and
a scooping portion, provided in the circulation member, for scooping the rollers moving in the loaded roller rolling path up into the unloaded return path, the scooping portion having a pair of diagonal corresponding parts that are in contact with diagonal parts of a rectangular side surface of each of the rollers, a width between the pair of diagonal corresponding parts tapering as the diagonal corresponding parts are deeper in the unloaded return path in such a manner that the unloaded return path has a rectangular-shaped cross section, and the rollers that move from the loaded roller rolling path to the unloaded return path being scooped up into the unloaded return path while the diagonal parts of each of the rollers are held by the diagonal corresponding parts.

2. A roller screw comprising:
a screw shaft having a spiral roller rolling surface formed on an outer peripheral surface of the screw shaft;
a nut having a loaded roller rolling surface formed in an inner peripheral surface of the nut, facing the roller rolling surface of the screw shaft;
a circulation member provided on the nut and having an unloaded return path connecting one end of the loaded roller rolling surface of the nut to an opposite end thereof;
a plurality of rollers arranged in a loaded roller rolling path between the roller rolling surface of the screw shaft and the loaded roller rolling surface of the nut and in the unloaded return path of the circulation member; and
a scooping portion, provided in the circulation member, for scooping the rollers moving in the loaded roller rolling path up into the unloaded return path, the scooping portion having a pair of diagonal corresponding parts which jut toward the screw shaft from an edge of a continuous path of V shaped cross section connected to the loaded roller rolling surface of the nut and which correspond to diagonal parts of a rectangular side surface of each of the rollers, and a width between the diagonal corresponding parts tapering as the pair of diagonal corresponding parts are deeper in the unloaded return path in such a manner that the unloaded return path formed by the diagonal corresponding parts and the continuous path has a rectangular-shaped cross section in accordance with a deepness of the unloaded return path.

3. The roller screw according to claim 1 or 2, wherein
the roller screw further comprises a plurality of retainers, each provided between adjacent ones of the rollers, for preventing the adjacent rollers from coming into contact with each other,
between the diagonal corresponding parts, a lip portion is provided for scooping the retainers out of a circulation raceway into the unloaded return path, and
the lip portion has inner wall surfaces that are away from a raceway of the rollers scooped by the diagonal corresponding parts.

4. The roller screw according to claim 3, wherein the inner wall surfaces of the lip portion has a cross section orthogonal to the unloaded return path, which cross section is V shaped in such a manner that an apex angle $\alpha$ formed by connecting the inner wall surfaces of the diagonal corresponding parts and an apex on a diagonal line connecting diagonal parts, out of contact with the diagonal corresponding parts, of each of the rollers scooped by the diagonal corresponding parts is less than 90 degrees.

5. The roller screw according to claim 3 or 4, wherein the inner wall surfaces of the lip portion are formed to be tapered in such a manner that a cross sectional area of the unloaded return path becomes larger from a side of the unloaded return path toward the loaded roller rolling path.

6. A roller screw, comprising:
a screw shaft having a spiral roller rolling surface formed on an outer peripheral surface of the screw shaft;
a nut having a loaded roller rolling surface formed in an inner peripheral surface of the nut, facing the roller rolling surface of the screw shaft;
a circulation member provided on the nut and having an unloaded return path connecting one end of the loaded roller rolling surface of the nut to an opposite end thereof;
a plurality of rollers arranged in a loaded roller rolling path between the roller rolling surface of the screw shaft and the loaded roller rolling surface of the nut and in the unloaded return path of the circulation member; and
a scooping path provided in the unloaded return path circulation member and having a scooping portion for scooping the rollers moving in the loaded roller rolling path up into the unloaded return path, a center line of the scooping path being outside of a tangential direction of the loaded roller rolling path when seen in an axial direction of the nut.

7. The roller screw according to claim 6, wherein
the unloaded return path of the circulation member has a straight path that extends in parallel with an axis line of the nut and direction change paths that are provided at respective ends of the straight path and each have the scooping path, and the direction change path is curved at a midpoint toward the straight path so as to connect the scooping path to the straight path.

8. The roller screw according to claim 6, wherein
the scooping portion covers each of the rollers when a center of the roller is positioned at a boundary between the loaded roller rolling path and the unloaded return path.

9. The roller screw according to claim 6 or 8, wherein each of the rollers has a spherical end surface.

10. The roller screw according to claim 6 or 8, wherein
the rollers are parallel-arranged with axis lines of adjacent ones of the rollers kept approximately in parallel with each other,
the scooping portion having a lip portion that juts toward the screw shaft and has a first wall part corresponding to an end surface of each of the rollers and a second wall part corresponding to a side surface of the roller, and
an edge of the second wall part is closer to the loaded roller rolling path than an edge of the first wall part so that the rollers moving from the loaded roller rolling path to the unloaded return path are constrained by the second wall part before the rollers are constrained by the first wall part.

* * * * *